US012038765B2

United States Patent
Manjunath et al.

(10) Patent No.: US 12,038,765 B2
(45) Date of Patent: Jul. 16, 2024

(54) VEHICLE CONTROL SYSTEM AND METHOD

(71) Applicant: Transportation IP Holdings, LLC, Norwalk, CT (US)

(72) Inventors: Avinash Hassan Manjunath, Bengaluru (IN); Steven Guy Clifton, Fountaindale (AU)

(73) Assignee: Transportation IP Holdings, LLC, Norwalk, CT (US)

( * ) Notice: Subject to any disclaimer, the term of this patent is extended or adjusted under 35 U.S.C. 154(b) by 464 days.

(21) Appl. No.: 17/404,980

(22) Filed: Aug. 17, 2021

(65) Prior Publication Data

US 2021/0373575 A1    Dec. 2, 2021

Related U.S. Application Data

(63) Continuation-in-part of application No. 17/005,947, filed on Aug. 28, 2020, now Pat. No. 11,614,741, (Continued)

(30) Foreign Application Priority Data

Jul. 5, 2021    (IN) .............................. 202111030192

(51) Int. Cl.
*G05D 1/02*      (2020.01)
*G05D 1/00*      (2006.01)
*G01V 11/00*    (2006.01)

(52) U.S. Cl.
CPC ......... *G05D 1/0289* (2013.01); *G05D 1/0223* (2013.01); *G01V 11/00* (2013.01)

(58) Field of Classification Search
CPC .... G05D 1/0289; G05D 1/0223; G05D 1/028; G01V 11/00; B60W 2554/802;
(Continued)

(56) References Cited

U.S. PATENT DOCUMENTS 7,260,461 B2    8/2007  Rao et al.
8,280,621 B2   10/2012  Edwards et al.
(Continued)

FOREIGN PATENT DOCUMENTS

EP       2495713 B1     9/2012
JP    2005238992 A     9/2005
(Continued)

OTHER PUBLICATIONS

Office Actio mailed May 19, 2023 for corresponding Eurasian Patent Application No. 202292126. English translation provided. (4 pages).

(Continued)

*Primary Examiner* — Calvin Cheung
(74) *Attorney, Agent, or Firm* — K&L Gates LLP

(57) ABSTRACT

A vehicle control system and method forecast an upcoming intersection area of projected paths of a first vehicle system and a second vehicle system based on current movements of the first vehicle system and the second vehicle system. A reach distance of the first vehicle system is calculated as a distance from a leading edge of the first vehicle system to the intersection area. A difference between the reach distance of the first vehicle system and a designated gap distance with the designated gap distance are compared. The speed of the first vehicle system is automatically reduced responsive to the difference being no smaller than the designated gap distance and/or the first vehicle system is stopped responsive to the difference being smaller than the designated gap distance.

17 Claims, 14 Drawing Sheets

Related U.S. Application Data which is a continuation-in-part of application No. 16/129,405, filed on Sep. 12, 2018, now Pat. No. 10,816,986, which is a continuation-in-part of application No. 15/226,151, filed on Aug. 2, 2016, now Pat. No. 10,101,432.

(58) Field of Classification Search
CPC ............ B60W 30/09; B60W 30/0956; B60W 60/0015; G08G 1/163
See application file for complete search history.

(56) References Cited

U.S. PATENT DOCUMENTS

| | | | |
|---|---|---|---|
| 9,177,477 B2 * | 11/2015 | Mochizuki | ............ G08G 1/162 |
| 9,725,059 B2 | 8/2017 | Okamura | |
| 9,747,802 B2 | 8/2017 | Fisher et al. | |
| 10,710,587 B2 | 7/2020 | Takeda et al. | |
| 10,816,986 B2 | 10/2020 | Manjunath et al. | |
| 2004/0024529 A1 | 2/2004 | Ibrahim | |
| 2004/0073367 A1 | 4/2004 | Altan et al. | |
| 2006/0091653 A1 | 5/2006 | De Mersseman et al. | |
| 2009/0259368 A1 | 10/2009 | Hadi et al. | |
| 2013/0059558 A1 | 3/2013 | Gehlen et al. | |
| 2016/0280134 A1 | 9/2016 | Miura et al. | |
| 2017/0101056 A1 | 4/2017 | Park | |
| 2017/0113665 A1 | 4/2017 | Mudalige et al. | |
| 2017/0158175 A1 | 6/2017 | Fairfield | |
| 2018/0099665 A1 | 4/2018 | You | |
| 2018/0208199 A1 | 7/2018 | Fujita et al. | |
| 2018/0259282 A1 * | 8/2018 | Ji | ............ G08G 1/096783 |
| 2018/0284787 A1 | 10/2018 | Naka et al. | |
| 2019/0001969 A1 | 1/2019 | Moennich et al. | |
| 2019/0118808 A1 * | 4/2019 | Kawasaki | ......... B60W 30/0956 |
| 2019/0126920 A1 | 5/2019 | You | |
| 2019/0243371 A1 * | 8/2019 | Nister | .................. G05D 1/0223 |
| 2019/0375400 A1 | 12/2019 | Zhang et al. | |
| 2020/0005645 A1 | 1/2020 | Wray et al. | |
| 2020/0074863 A1 | 3/2020 | Jung et al. | |
| 2021/0009117 A1 | 1/2021 | Emura | |

FOREIGN PATENT DOCUMENTS

| | | |
|---|---|---|
| JP | 2007091208 A | 4/2007 |
| JP | 2007128182 A | 5/2007 |
| JP | 2007264884 A | 10/2007 |
| JP | 2009003538 A | 1/2009 |
| JP | 2012079105 A | 4/2012 |
| JP | 2017224033 A | 12/2017 |
| JP | 2017224064 A | 12/2017 |
| JP | 2018095097 A | 6/2018 |
| JP | 2020147092 A | 9/2020 |
| WO | 2011110227 A1 | 9/2011 |
| WO | 2014064831 A1 | 5/2014 |
| WO | 2016020290 A1 | 2/2016 |

OTHER PUBLICATIONS

First Examination Report mailed Oct. 10, 2023 for corresponding Australian Application No. 2022218489 (8 pages).

Office Action mailed Oct. 4, 2023 for corresponding Japanese Patent Application No. 2022125883 (10 pages).

Search Report issued Jan. 20, 2023 for corresponding Eurasian Patent Application No. 202292126. English translation provided. (5 pages).

Office Action mailed Nov. 30, 2023 for corresponding Eurasian Patent Application No. 202292126/31 (4 pages).

Examination Report mailed Jul. 5, 2023 for corresponding Indian Patent Application No. 202111030192 (6 pages).

* cited by examiner

VEHICLE CONTROL SYSTEM AND METHOD

CROSS-REFERENCE TO RELATED APPLICATIONS

This application is a continuation-in-part of U.S. patent application Ser. No. 17/005,947, filed 28 Aug. 2020 (now U.S. Pat. No. 11,614,741), which is a continuation-in-part of U.S. patent application Ser. No. 16/129,405, filed 12 Sep. 2018 (now U.S. Pat. No. 10,816,986), which is a continuation-in-part of U.S. patent application Ser. No. 15/226,151, filed 2 Aug. 2016 (now U.S. Pat. No. 10,101,432). This application also claims priority to Indian patent application 202111030192, which was filed on 5 Jul. 2021. The entire disclosures of these applications are incorporated herein by reference.

BACKGROUND

Technical Field

The subject matter described herein relates to vehicle controls, navigation and associated methods.

Discussion of Art

Knowledge of the location of a vehicle relative to the environment of the vehicle can be crucial, particularly for autonomous vehicles and/or vehicles operating in areas without clear lines of sight. There are several systems which utilize electromagnetic energy to detect objects within an environment and to measure relative distances between objects. For example, conventional electromagnetic energy ("EM")-based distance measuring systems typically use received signal strength indicators for proximity detection, while an EM carrier signal can be modulated with transmitter identification data. Due to the EM frequency being very low (e.g., on the order of a few kilohertz), transmission of data on the carrier signal can take a long time. This, in turn, can reduce how many transmitters can be reliably identified within a given space or environment and within a limited amount of time. Additionally, the time needed for measuring distances can be quite long and may not be suitable for vehicles moving at higher speeds.

Another issue associated with existing EM-based distance monitoring systems is the need to negotiate, in real-time, transmission slots for the transmitters within the given environment or reception area to avoid on-air collisions. In environments where the number of transmitters is fluid (e.g., where a growing number of transmitters randomly move in an out of the environment or reception area, such as on roadways), and given the relatively long duration of EM broadcasts, this problem can quickly become unmanageable. This problem can limit how many transmitters can be used at the same time to just a small few and can increase distance update periods to seconds rather than milliseconds.

Other known systems utilize global positioning, system (GPS) tracking to determine the position of vehicles within an area, for use in collision avoidance and reporting, for example. While generally suitable for above ground applications, GPS tracking is not available underground, rending such systems particularly unsuitable for underground applications and the like.

In view of the above, there may be a need for a position and proximity detection system and method which differ from those systems and methods that are currently available.

BRIEF DESCRIPTION

In one embodiment, a method includes forecasting an upcoming intersection area of projected paths of a first vehicle system and a second vehicle system based on current movements of the first vehicle system and the second vehicle system, calculating a reach distance of the first vehicle system, the reach distance determined as a distance from a leading edge of the first vehicle system to the intersection area, comparing a difference between the reach distance of the first vehicle system and a designated gap distance with the designated gap distance, and one or more of (a) automatically reducing a speed of the first vehicle system responsive to the difference being no smaller than the designated gap distance and/or (b) automatically stopping the first vehicle system responsive to the difference being smaller than the designated gap distance.

In another example, a method includes measuring an angular velocity of a first vehicle system that is moving, calculating an upcoming curved path of the first vehicle system using the angular velocity that is measured, monitoring movement of a second vehicle system, determining whether the second vehicle system will be within a critical distance along the upcoming curved path, a warning distance along the upcoming curved path, or an alert distance along the upcoming curved path within one or more designated periods of time, and one or more of automatically stopping the first vehicle system responsive to determining that the second vehicle system will be within the critical distance within the one or more designated periods of time, automatically slowing the first vehicle system responsive to determining that the second vehicle system will be within the warning distance within the one or more designated periods of time, and/or generating an alert to an operator of the first vehicle system responsive to determining that the second vehicle system will be within the alert distance within the one or more designated periods of time.

In another example, a system includes a vehicle controller configured to be disposed onboard a first vehicle system and to control movement of the first vehicle system. The vehicle controller is configured to forecast an upcoming intersection area of projected paths of the first vehicle system and a second vehicle system based on current movements of the first vehicle system and the second vehicle system. The vehicle controller is configured to calculate a reach distance of the first vehicle system as a distance from a leading edge of the first vehicle system to the intersection area. The vehicle controller is configured to compare a difference between the reach distance of the first vehicle system and a designated gap distance with the designated gap distance. The vehicle controller is configured to one or more of (a) automatically reduce a speed of the first vehicle system responsive to the difference being no smaller than the designated gap distance and/or (b) automatically stop the first vehicle system responsive to the difference being smaller than the designated gap distance.

BRIEF DESCRIPTION OF THE DRAWINGS

The inventive subject matter may be understood from reading the following description of non-limiting embodiments, with reference to the attached drawings (wherever possible, the same reference characters used throughout the drawings refer to the same or like parts), wherein below.

DETAILED DESCRIPTION

Embodiments of the inventive subject matter relate to a vehicle control system, a navigation system therefor, and detecting a proximity of objects within a reception area adjacent to the vehicle. Certain embodiments relate to systems and methods for detecting the proximity of objects or vehicles in relation to a subject vehicle within a reception area or environment. In one embodiment, a system for proximity detection includes a first vehicle having an emitter that can transmit/omit a high RF signal synchronously with at least one EM pulse, and a receiver unit located remote from the first vehicle, the receiver unit including a magnetic field receiver, an RF transceiver, and a processing module coupled to the RF transceiver and the magnetic field receiver. The receiver unit can receive the high RF signal and the EM pulse from the first vehicle and to determine a proximity of the first vehicle to the receiver unit. In one embodiment, the proximity of the first vehicle to the receiver unit is calculated in dependence upon received magnetic field strength. While the description herein focuses on vehicles or vehicles operating in subsurface or underground environments, not all embodiments of the inventive subject matter are limited to vehicles. One or more embodiments may be used for proximity detection and/or collision avoidance for other types of vehicles, such as automobiles (manually driven and/or autonomous or driverless cars), rail vehicles, mining vehicles, trucks, buses, marine vessels, aircraft, or the like. Optionally, one or more embodiments may be used with vehicles that extract resources from above-ground or above-surface locations, such as an open pit containing resources.

Figure 1:
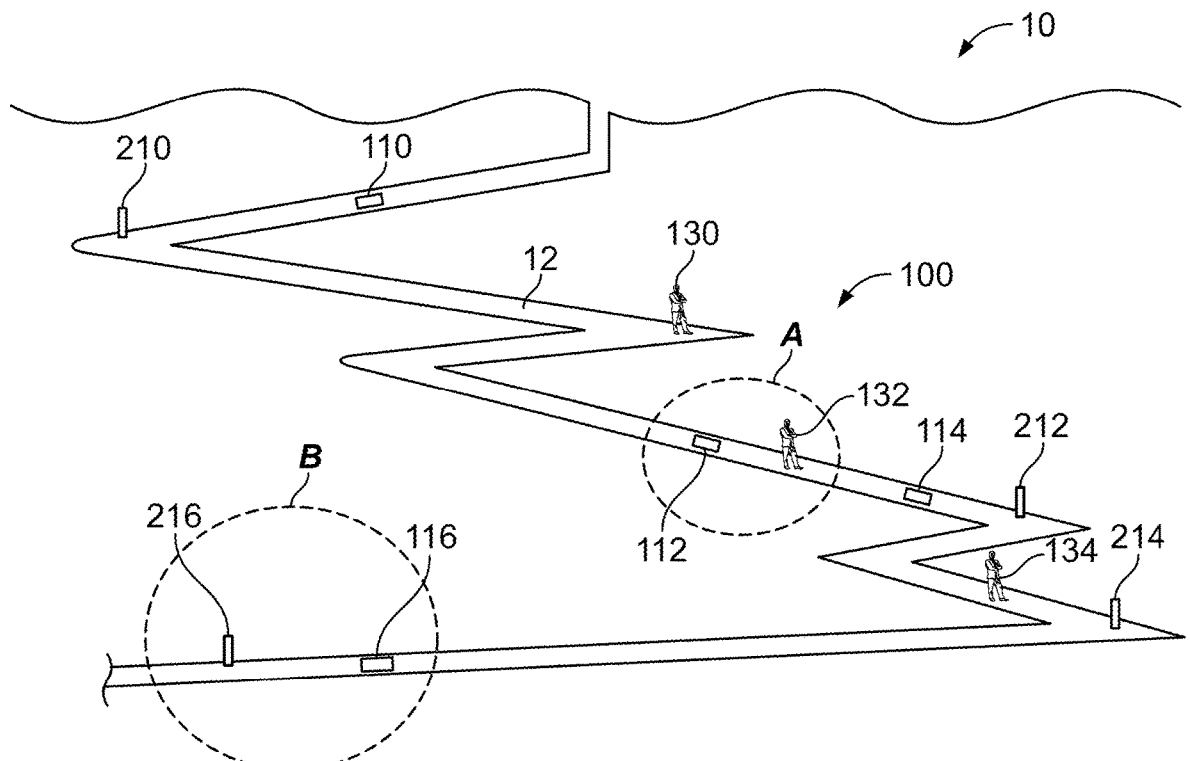
FIG. 1 is a simplified schematic illustration of a reception area showing a plurality of vehicles and personnel with which a position and proximity detection system may be utilized, according to one embodiment.

FIG. 1 schematically illustrates a reception area or environment 10 within which a position and proximity detection system 100 may enter or exit, according to one embodiment. The system optionally can be referred to as a vehicle collision avoidance system or a mobile equipment collision avoidance system. As an example, the reception area may be an underground mine, a parking lot, a drayage lot, a road system, flight paths, waterways or a rail yard, and the like, having a route 12 along which a plurality of vehicles and personnel are configured/designated to travel and to operate. In an embodiment, the route may be a haul route for the vehicles. In other embodiments, the reception area may be a loosely defined area into and out of which vehicles or objects travel, such as a body of water (within which marine vessels travel), a roadway (on which automobiles, e.g., driver or driverless automobiles travel), a railway (on which locomotives travel), or other environment. As used herein, "reception area" means an area surrounding and adjacent to a vehicle or object equipped with a proximity detection unit described herein into or out of which the vehicle may travel.

Figure 2:
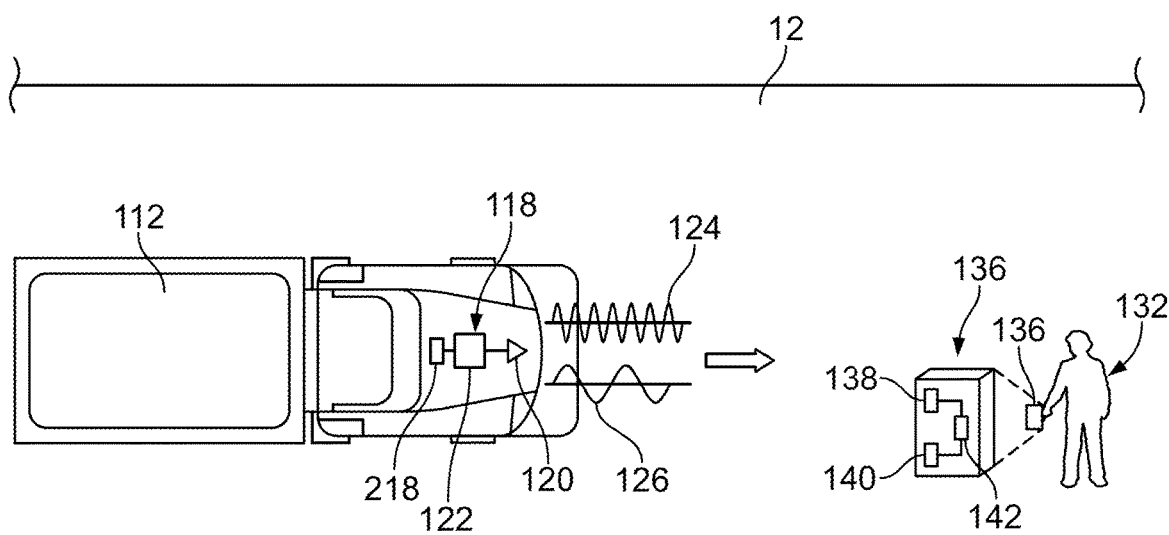
FIG. 2 is detail view of area A of FIG. 1, showing a vehicle equipped with a proximity detection system according to one embodiment.

The position and proximity detection system may include one or more proximity detection units disposed onboard one or more vehicles (e.g., vehicles 110, 112, 114, 114. As illustrated in FIG. 2, each proximity detection unit may include a transceiver 120 and a control unit 122 (e.g., microprocessor-based circuit) electrically connected or otherwise communicatively coupled to the transceiver. In certain embodiments, the transceiver may be separate transmitter/emitter and receiver devices. The proximity detection unit, including the transceiver, may be mounted anywhere within the first vehicle 112 such as, for example, in the trunk of the vehicle or in an engine compartment of the vehicle. The transceiver may include at least first and second output channels. In an embodiment, the first output channel is a high frequency RF channel and the second output channel is low frequency EM channel. The transceiver can generate both high radio frequency ("RF") signals, signal 124 (e.g., an RF broadcast), and EM pulse transmissions, e.g., EM pulse 123, utilizing the first and second channels, respectively.

Suitable proximity detection units can detect vehicles or other objects within the reception area. In an embodiment, the transceiver, under control of the control unit, can generate an unmodulated, short EM pulse (e.g., a few oscillation cycles) synchronously with a modulated, RF signal via the first and second channels, respectively. The EM pulse and the RF signal are of fixed duration. In an embodiment, pulse does not carry any data and is only used for signal strength (distance) measurements, while the high RF signal carries the identifying information of the transceiver (i.e., it is modulated with a transceiver/emitter ID or vehicle ID). In an embodiment, the ID (e.g., identity or identification) may be protected by a checksum.

With further reference to FIGS. 1 and 2, the system may include one or more receiver units 136 carried by, or associated with, objects or personnel within the reception area such as, for example, persons or operators 130, 132, 134. The receiver units each may include an alternating or constant magnetic field receiver 138, an RF transceiver 140, and a processing module 142 (e.g., processor circuit) electrically connected to the magnetic field receiver and RF transceiver. In an embodiment, the processing module may be provided with information of the strength of the magnetic field emitted by the proximity detection units of the system (e.g., stored in non-transitory memory), as well as a lookup table or algorithm through which the processing module may calculate the distance from the vehicle that generated the EM pulses, as discussed in detail hereinafter.

Figure 3:
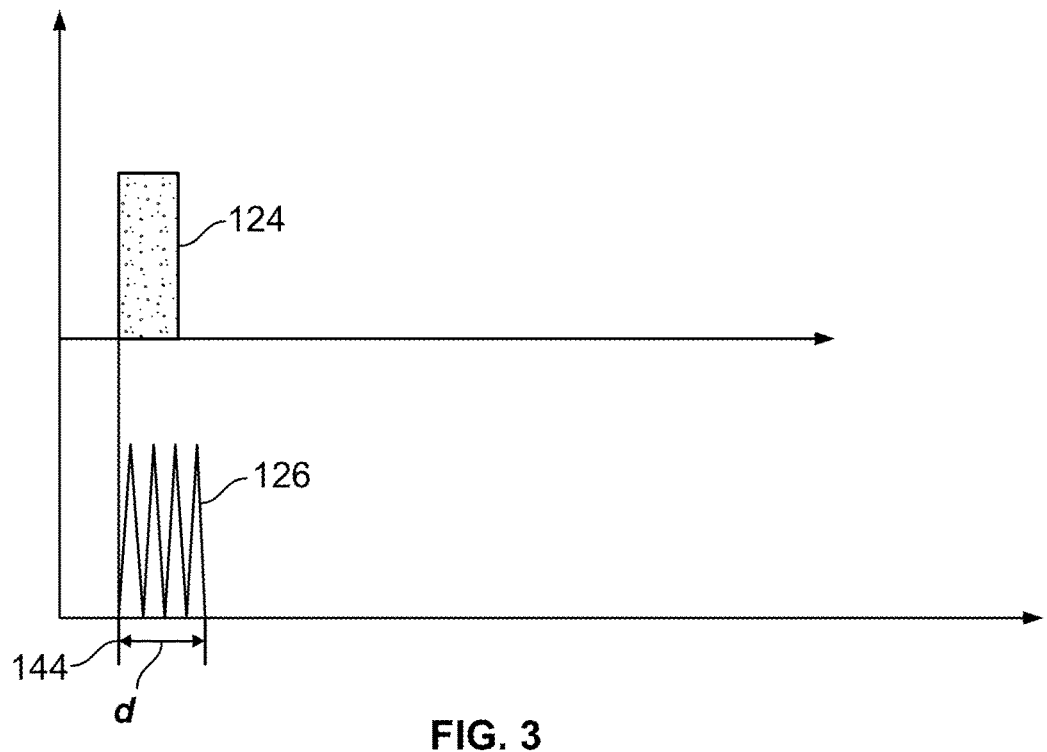
FIG. 3 is a diagram illustrating one embodiment of synchronous transmissions carried out by the proximity detection system.

In operation, as the plurality of vehicles travel throughout the reception area, the proximity detection units onboard each vehicle synchronously transmit the RF signal (carrying the transceiver/emitter and/or vehicle ID) and EM pulses via the emitter (e.g., transceiver). For example, as illustrated in FIG. 2, the proximity detection unit onboard the first vehicle generates the RF and EM transmissions, respectively, which then propagate through space until the transmissions reach another vehicle or object within the reception area (such as a person carrying a receiver unit). The magnetic field receiver of the receiver unit receives the EM pulses, while the RF transceiver receives the RF signal. The start time of the received RF signal and the start and stop time of the detected EM pulse are recorded by the processing module and are used to verify the EM pulse duration and synchronicity of the EM pulse with the RF signal to link the RF signal and EM pulses to one another. With reference to FIG. 3, a synchronous start 144 of the RF signal and EM pulse is verified on the receiving end (e.g., at the receiving unit). Likewise, the EM pulse duration, d, is measured on the receiving end (e.g., at the receiving unit). This ensures that no two EM transmissions from two different transmitters can be mistaken for each other on the receiving end. The transmissions are either received clearly and accepted or rejected if the RF signal checksum fails or the EM signal duration is measured incorrectly due to a rare RF collision or EM noise.

Moreover, the control unit may employ a listen-before-talk mechanism with a random back-off delay on the high RF channel to arbitrate concurrent communications from competing transceivers, such as transceivers deployed on other vehicles within the reception area. The control unit may sense or "listen" to the radio environment within the reception area prior to generating the transmissions to prevent concurrent transmission from competing transceivers. The control unit can ensure that the reception area is clear of competing transmission prior to RF and EM transmission.

The processing module of the receiver unit receives the RF transmission and EM pulses, and may link the transmissions to one another to verify or validate the source. The processing module determines the distance between the receiver unit (carried by a person) and the emitter on-board the first vehicle based on the strength of the received magnetic field. A certain level of a received signal indicates a certain distance. For example, in certain embodiments, the distance measurement may be based on the generated magnetic field intensity. The generated field power can be calibrated and known. The relationship between field intensity and distance also can be known and sampled. The transceiver/receiver that receives the transmissions measures the field intensity and matches the field intensity with a prerecorded distance in a lookup table stored in memory of the processing module. In other embodiments, a model based on the known physical formulas for EM field propagation can be utilized.

As indicated above, the processing module of the receiver unit may be preconfigured with the emitted field strength (which may be a fixed value for the entire system). In other embodiments, the strength of the field emitted by the proximity detection unit may be transmitted from the proximity detection unit to the receiver unit via the RF channel in addition to the transceiver/vehicle ID information. The emitted field strength and the received field strength values may then be utilized by the processing module to calculate or determine the distance from the first vehicle from which the transmissions were made, such as via a lookup table or algorithm stored in memory. Once the field strength has been converted to a distance measurement by the processing module of the receiver unit, this measurement is communicated back to the proximity detection unit of the first vehicle via the RF channel (e.g., RF transceiver to originating transceiver). This distance measurement may then be used by control unit onboard the first vehicle to determine a vehicle action to be taken (e.g., continue on route, change route, slow, stop, notify an operator, etc.). Alternatively, the control unit of the proximity detection unit can receive RF signals and/or EM pulses emitted by other proximity detection units and can measure the distances to the other proximity detection units as described herein in connection with the receiving unit.

In addition to communicating the distance measurement back to the originating transceiver of the first vehicle, the receiver unit and/or control unit may also be that can generate an alarm or alert if a preset 'safety' distance threshold has been breached. In an embodiment, the alert may be an audible alarm, a visual alert, or other sensory alert. For example, the receiver unit and/or control unit may include one or more LEDs, vibrators, speakers or the like for attracting a user's attention to the fact that the preset safety threshold has been breached. This alert may prompt an operator to increase the distance between himself/herself and the vehicle, or to seek a safe location until the vehicle passes by.

The proximity detection system can determine the proximity of vehicles operating within the reception area to an object or person outfitted with a receiver unit, and to generate alerts or notifications (either at the receiver unit or the vehicles themselves, or both). In this way, operational safety within the reception area may be increased, and bottlenecking or backups may be minimized or eliminated.

In certain embodiments, the transceiver onboard the vehicles may include air EM or constant magnetic field receiver, so that distances between vehicles may be determined. A suitable alternative or additional capability of the proximity detection system may include one or more of a time-of-flight (TOF) detector, LIDAR, and a video or camera system.

A suitable RF transmission frequency of the high RF signal may include determined frequencies within the megahertz (MHz) to gigahertz (GHz) range. In one embodiment, the high RF signal is at least 1 MHz. In various embodiments, the RF signal frequency is on the lower end of the MHz to GHz range. The higher the frequency, the quicker the signal, which allows more vehicles to be present within the reception area as compared to existing systems. Accordingly, a higher frequency may be utilized where a high volume of vehicle traffic is anticipated. In certain embodiments, the frequency for the RF signal may be selected in dependence upon a number of factors including the number of vehicles that are anticipated or estimated to be present in a particular reception area at a given time and the particular application for which the system is used (e.g., on a roadway, within an underground mine, etc.). For example, in underground applications, it may be desirable to use a lower frequency for the RF signal, where a direct line-of-sight between vehicles operating within the space is not always present. This is because the lower the frequency, the less dependent the system is on the availability of a direct line-of-sight (which is often not possible within the many twists and turns of a mine), due to the RF wave diffraction (e.g., bending around corners) and the ability to penetrate walls within the mine.

In an embodiment, the EM frequency may be as low as zero (i.e., a constant magnetic field, but not electrical). In such a case, the detector of the transceiver will sense a momentary change in the magnetic field of the earth and derive the induced vector from the change in the magnetic field, based on a pre-measured baseline. In an embodiment, the EM frequency is selected to be as low as possible, as there are less induced currents in metallic objects placed in between the transmitter and receiver, and there is less of the associated field intensity loss due to such induced currents. In addition, selecting a low frequency for the EM pulses achieves a much higher immunity to various EM noises coming from possible electrical and electronic devices located within the reception area. Utilizing a constant magnetic field allows alternating EM noise to be filtered out. In connection with the above, utilizing a constant magnetic field is possible because the EM field is not used as a data carrier. This has heretofore not been possible with existing systems, because the EM field had typically been used as a data carrier.

Because of the much shorter transmission time as compared to existing electromagnetic energy-based distance measuring systems, the time taken to measure the distance between the transmitter and receiver (e.g., the distance between vehicles), and to uniquely identify the transmitter, may be reduced. The systems and methods described herein can allow transmission times to be reduced from about 100 times to about 500 times compared to some known systems and methods. Moreover, the multiple transceiver time slot arbitration issue present in some existing systems can be resolved by using a listen-before-talk mechanism employed by one or more embodiments of the control unit described herein. This, in turn, allows for more vehicles or objects to operate within the reception area, and for shorter periods of time between the distance measurements.

While the system 100 described above may be utilized to determine the proximity of vehicles to operators or personnel and other objects carrying or outfitted with a receiver unit to prevent vehicle incursions into areas where personnel are operating, there may remain a need to determine the absolute position of one or more vehicles within a reception area 10, irrespective of other personnel or objects within the reception area. To address this issue, the vehicles operating within the reception area may also be outfitted with an on-board navigation system that can determine or calculate the position of the vehicle within the reception area (e.g., an underground mine, a parking lot, a rail yard), and the reception area may have a plurality of fixed-position beacons 210, 212, 214, 216 that can communicate with the vehicles, as further shown in FIG. 1.

The beacons may include a respective transceiver unit that enables communication with the vehicles when the vehicles are in range, such as, for example, by way of radio communications. In an embodiment, the beacons can transmit the positions/locations of the beacons within the reception area 10 to the vehicles that pass within range of the respective beacon. In other embodiments, the beacons are that can transmit identifying information to the vehicles within range, which may then be cross-referenced with a database on-board the vehicle that indicates the specific location of the communicating beacon within the reception area 10 based on the received beacon ID.

Figure 4:
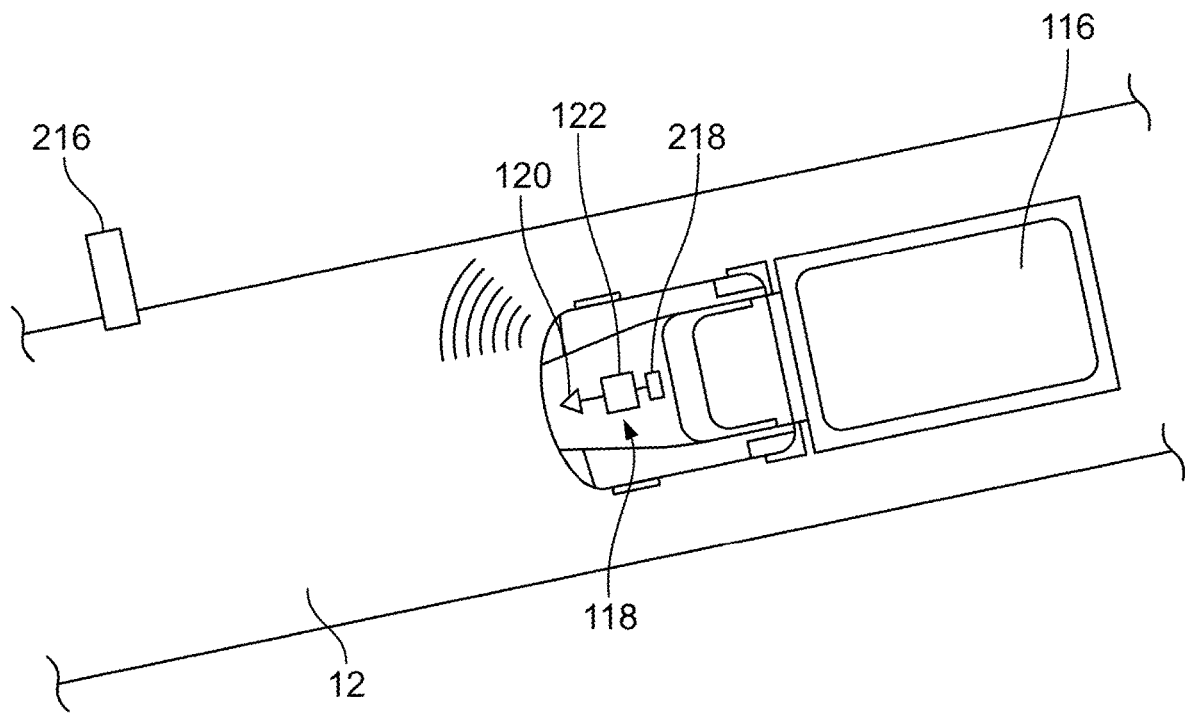
FIG. 4 is a detail view of area B of FIG. 1.

With reference to FIG. 4, a navigation system 218 onboard each vehicle (e.g., a second vehicle) includes an inertial platform type navigation device that may employ, for example, motion sensors (accelerometers) and rotation sensors (gyroscopes) to continuously calculate via dead reckoning the position, orientation, and velocity (e.g., direction and speed of movement) of the second vehicle without the need for external references. The second vehicle can communicate with the beacons, as well as with other vehicles, when the vehicle is in range. For example, as shown in FIG. 4, the first vehicle can communicate via the transceiver of the second vehicle, and optionally with the beacon, as the vehicle first passes by the beacon or moves relative to the second vehicle. In an embodiment, the transceiver and control unit may be the same transceiver and control unit used for proximity detection, as discussed above. In other embodiments, the transceiver and control unit may be stand-alone devices.

In operation, each vehicle (e.g., second vehicle) can maintain a history or log of the exact movements of the vehicle throughout a given area, such as along the route, using the navigation device onboard the first vehicle. Each second vehicle can calculate the position of the vehicle within the reception area, using the onboard navigation device and via dead reckoning. The recorded position of the second vehicle may then be transmitted or broadcast (such as through a radio link) to other vehicles within range to ensure that collisions are avoided. During vehicle travel, however, the estimated position of each vehicle (as determined by the on-board navigation device) may vary from the actual position of each such vehicle. The system can zero out such accumulated error or drift (e.g., the actual position of the vehicle in relation to the estimated position as determined by the navigation device) through use of the beacons.

As the vehicles pass within range of the beacons (the exact position of which are known and logged, as discussed above), the estimated position of any such vehicle is updated with a precise, known position received from the beacon. As a result, while drift or error in the estimated position of a vehicle can accumulate as the vehicles are traveling between beacons, passing by any beacon within the reception area essentially resets or recalibrates the control unit and navigation device, preventing accumulated error or drift from propagating throughout an entire path of travel of the vehicle.

In an embodiment, the position determination system may be utilized to create a data breadcrumb trail for subsequent use by mine operators for incident playback and the like. The path of travel (including time and location) of each vehicle may be logged by the on-board control unit and transmitted back to the surface when the vehicle is in range (for example) of a Wi-Fi access point or a leaky feeder system within the mine. This data can be used for efficiency, tire wear, uptime, tracking in use time vs. idle time, etc.

While FIG. 1 shows the proximity detection system (e.g., vehicles equipped with an RF and EM pulse emitter/transmitter and objects and personnel outfitted with receiver units to calculate vehicle proximity) and the position determination system (e.g., vehicles equipped with an on-board navigation system and which are that can communicate with static beacons within the reception area) as being a single, integrated system, the system may be separate systems that can be deployed independently or in conjunction with one another. The proximity detection capabilities may be deployed irrespective of position determination functionality, and vice versa. For example, in an embodiment, the system may include the vehicles outfitted with navigation systems that are that can estimate the position of the respective vehicle within the reception area, and the beacons arranged at various locations within the reception area that provide the vehicles passing thereby with known (or absolute) reference points so that any accumulated navigational error can be zeroed out. In other embodiments, the system may include vehicles outfitted with proximity detection units that are that can emit RF signals and EM pulses, and objects or personnel carrying receiver units that are that can receive the RF signals and EM pulses and calculate the proximity of the emitting vehicles. That is, proximity detection and position determination functionality may be integrated into a single, comprehensive system, or may deployed separately and independently from one another.

In one embodiment, the transceivers of the proximity detection units onboard vehicles can receive signals, such as the EM pulses and RF signals, sent from the transceivers of other proximity detection units to detect the proximity of vehicles to each other and/or to other objects. For example, a first proximity detection unit onboard a first vehicle can send EM pulses and RF signals that are received by a second proximity detection unit of a second vehicle. The control unit of the second proximity detection unit can determine how far the first vehicle is from the second vehicle in the manner described above in connection with the receiver unit.

Optionally, the system may be used to detect the proximity (e.g., distance between) equipment and a target location. For example, vehicles may include elongated drill tips or other equipment used to mine for resources. The system can be used to measure or otherwise determine how far the equipment is from other equipment or vehicles. This can help prevent collisions between equipment that may project far from a vehicle and other vehicles, or collisions between projecting equipment on different vehicles. For example, the transceiver can be disposed on or near outer ends of equipment that projects from a vehicle (e.g., at or near the end of a drill tip). The transceivers or beacons can be disposed on other vehicles, other equipment, and/or persons to ensure that the equipment does not collide with the other vehicles, equipment, or persons. Additionally, a target location can be provided with the transceiver or beacon, and equipment can be provided with the transceiver or beacon. The system can then be used to track how far the equipment (e.g., the drill tip) is from a target location (an identified location of resources to be mined).

In some of the embodiments, the high RF signal may be a high RF broadcast, referring to a signal that is transmitted generally throughout an area and without a particular or designated recipient.

In an embodiment, a vehicle system is provided. The vehicle system includes a first vehicle having an emitter that can emit a high RF signal synchronously with at least one EM pulse, and a receiver unit located remote from the first vehicle, the receiver unit including a magnetic field receiver, an RF transceiver, and a processing module coupled to the RF transceiver and the magnetic field receiver. The receiver unit can receive the high RF signal and the at least one EM pulse from the first vehicle and to determine a proximity of the first vehicle to the receiver unit. In an embodiment, the high RF signal is modulated with an emitter/transceiver and/or vehicle ID. In an embodiment, the miller or vehicle ID is protected by a checksum. In an embodiment, the at least one EM pulse does not carry any data. In an embodiment, the proximity of the first vehicle to the receiver unit is calculated in dependence upon received magnetic field strength. In an embodiment, the processing module of the receiver unit can generate an alert if the determined proximity of the first vehicle is within a preset range. The alert may be at least one of an audible alert, a visual alert, and/or a vibratory alert. In an embodiment, the receiver unit can communicate the determined proximity back to the first vehicle. In an embodiment, the first vehicle is a vehicle operating in an underground mine. In an embodiment, the receiver unit can verify that the RF signal and the at least one EM pulse occurred synchronously.

In another embodiment, a method is provided. The method includes the steps of, at a first vehicle, synchronously generating a high RF signal and at least one EM pulse; at a receiver unit, receiving the high RF signal and the at least one EM pulse; and at the receiver unit, determining a distance between the first vehicle and the receiver unit in dependence upon a strength of the at least one EM pulse received by the receiver unit. In an embodiment, the method in may also include the step of, prior to generating the high RF signal and the at least one EM pulse, checking for a competing transmission from a second vehicle. In an embodiment, the method may also include the step of, at the receiver unit, verifying that the transmission of the high RF signal and the at least one EM pulse occurred synchronously. In an embodiment, the method may also include the step of, at the receiver unit, measuring a duration of the at least one EM pulse. In embodiment, the method may also include the step of modulating the high RF signal with a transceiver ID and/or vehicle ID. In an embodiment, the transceiver or other ID is protected by a checksum. In an embodiment, the at least one EM pulse does not carry any data. In an embodiment, the first vehicle is an autonomous vehicle. In an embodiment, the method may also include, at the receiver unit, generating an alert if the distance is below a predetermined threshold or within a preset range. In an embodiment, the method may further include the step of communicating the determined distance back to the first vehicle.

A suitable system may include a receiver unit having a magnetic field receiver, an RF transceiver, and a processing module coupled to the RF transceiver and the magnetic field receiver. The RF transceiver can receive a high RF signal from a vehicle that is remote from the receiver unit. The magnetic field receiver can receive at least one EM pulse from the vehicle. The processing module can verify that emission of the high RF signal and the at least one EM pulse from the vehicle occurred synchronously. The processing module is further configured, responsive to verification that the emission occurred synchronously, to determine a proximity of the vehicle to the receiver unit based on at least one of the high RF signal or the at least one EM pulse. The processing module is further configured, responsive to verification that the emission did not occur synchronously, to reject the high RF signal and the at least one EM pulse for use in determining the proximity.

In another embodiment, a system includes a first vehicle having an on-board navigation system that can determine a position of the first vehicle within a reception area without external references, and at least one beacon positioned at a location within the reception area along a route over which the first vehicle travels. The at least one beacon stores location data of the at least one beacon within the reception area. The first vehicle can wirelessly receive the location data from the at least one beacon when the first vehicle passes within range of the at least one beacon. For example, the first vehicle and the at least one beacon may be that can communicate over a radio link.

In an embodiment, a system includes a first vehicle having an on-board navigation system that can determine a position of the first vehicle within a reception area without external references, and at least one beacon positioned at a location within the reception area along a route over which the first vehicle travels. The at least one beacon stores location data of the at least one beacon within the reception area. The first vehicle can receive the location data from the at least one beacon when the first vehicle passes within range of the at least one beacon. The first vehicle includes a receiver and a control unit electrically coupled to the receiver and the navigation system. The control unit can utilize the location data from the at least one beacon to eliminate errors in the position of the first vehicle as determined by the navigation system. In an embodiment, the navigation system can determine the position of the first vehicle via dead reckoning.

The control unit of the collision avoidance system optionally can be included in a vehicle control system that also includes and/or operates with the collision avoidance system. The control unit can be communicatively coupled with a propulsion system and/or braking system of a vehicle. For example, the control unit can communicate with and control one or more engines, motors, transmissions, brakes, or the like, of the vehicle to control and change movement of the vehicle. The control unit can control or change movement of the vehicle based on the distance of one or more objects (e.g., equipment, a target location, a person, and/or another vehicle) to the vehicle being too small (e.g., less than a safety threshold distance). For example, a receiver unit can receive the EM pulse and the RF signal and determine a distance between the vehicle and the receiver unit based on the EM pulse and the RF signal that are received. The receiver unit can then communicate a signal to one or more transceiver devices of the control system based on the distance. The control unit can examine this distance and change the movement of the vehicle (e.g., to avoid collision with the other object). For example, if the distance between the vehicle and other object is too short and/or is decreasing, the control unit can change the throttle setting and/or apply the brakes of the vehicle to slow or stop movement of the vehicle. As another example, the control unit can change a direction in which the vehicle is moving to avoid collision with the other object.

The vehicle collision avoidance system optionally can use a point-quadrant-based vehicle-to-vehicle alarm logic to provide a solution for vehicle-to-vehicle collision avoidance in an environment. This logic can be applied by the control units and/or processing modules described herein. The location and/or heading of vehicles can be determined in one or more of a variety of different ways, such as using the EM pulses and RF transmissions described above, using data obtained by GPS receivers, calculating distances based on times-of-flight of electromagnetic signals (that reflect off other objects, such as radar), structured light arrays, or the like. In the case of another moving vehicles, the processing module can determine a heading of the other vehicle and/or a location of the other vehicle. In the case of another stationary vehicle, the processing module can determine a location of the other vehicle (as the stationary vehicle would not have a heading).

The locations and/or headings determined by the processing module can be communicated to the control unit of a vehicle to determine whether to advise the operator of the vehicle to slow or stop movement of the vehicle, and whether to automatically slow or stop movement of the vehicle (if the operator does not respond or change movement of the vehicle according to the advice provided).

Optionally, the control unit may advise the operator to change a heading of the vehicle and/or automatically change the heading of the vehicle if the operator does not change the heading. The advice and/or automatic control provided by the control unit can prevent collisions between the vehicle and other objects (e.g., other vehicles, persons, equipment, etc.).

Figure 5:
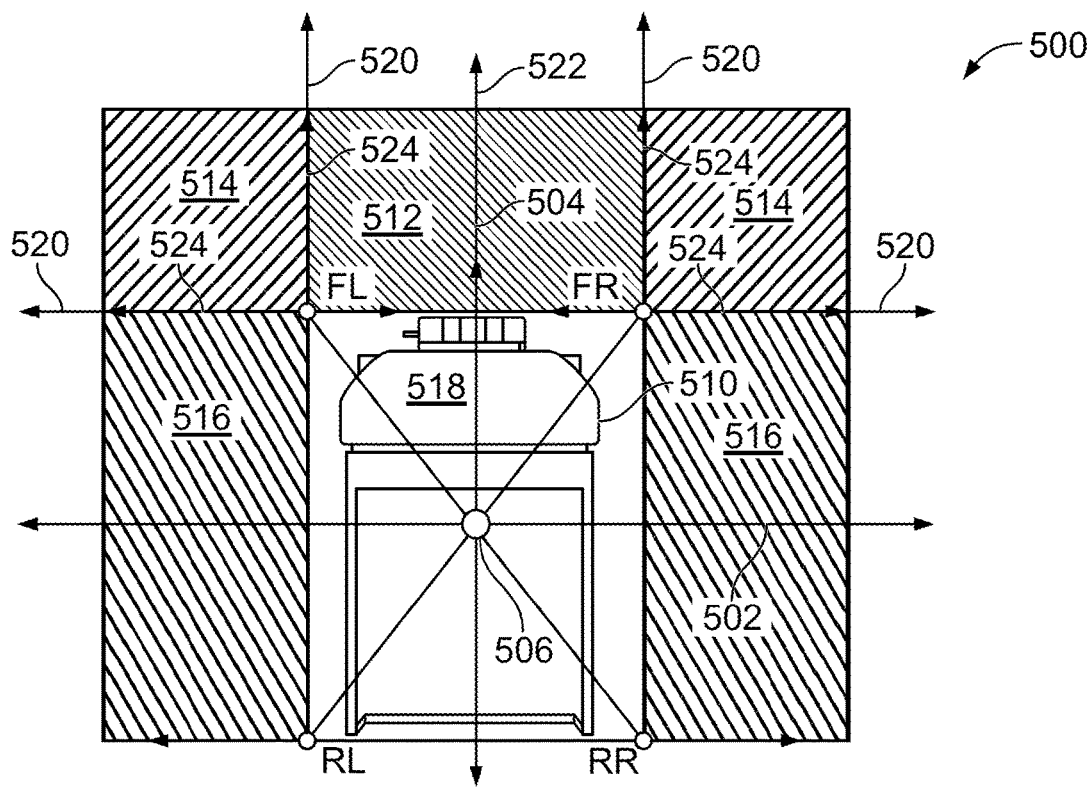
FIG. 5 illustrates one embodiment of a vehicle collision avoidance system.

FIG. 5 illustrates one embodiment of a vehicle collision avoidance system 500. In one embodiment, the system 100 can be for use in an underground area. While the system 500 is used in an open pit or surface area. Alternatively, the system 500 can be used in the underground area and can represent the system 100 described above. The system 500 can include a proximity sensing unit 518 that is one of the proximity detection units described above onboard a vehicle 510. Optionally, the sensing unit 518 shown in FIG. 5 can represent a receiver unit described above. The sensing unit 518 operates to determine whether other objects are near the vehicle 510 such that movement of the vehicle 510 needs to be altered to avoid collision with the object(s). For example, the sensing unit 518 can emit EM pulses and RF signals that are detected by a receiver unit to determine the proximity of other objects to the sensing unit 518 and, therefore, the vehicle 510, as described above. Alternatively, the sensing unit 518 can receive the EM pulses and/or RF signals to determine the proximity of other objects to the sensing unit 518 and, therefore, the vehicle 510, as described above. Alternatively, the sensing unit 518 can use another technique, such as GPS, radar, or the like, to determine the proximity of other objects to the sensing unit 518 and, therefore, the vehicle 510, as described above. With respect to GPS, the sensing unit 518 can communicate with sensing units 518 onboard or carried by other objects to share headings and/or positions of the sensing units 518 to determine the proximity of other objects to the sensing unit 518 and, therefore, the vehicle 510.

The control unit or processing module of the sensing unit 518 controls operation of the sensing unit 518. This control unit or processing module of the sensing unit 518 can be referred to as a controller of the sensing unit 518. The controller can represent the control unit or the processing module. The controller can generate output to warn an operator to slow movement, stop movement, or change a direction of movement of the vehicle 510 based on the detected proximity of other objects. Optionally, the control unit can automatically slow movement, stop movement, or change the direction of movement of the vehicle 510 based on the detected proximity of other objects.

The controller of the sensing unit defines protection points around the exterior body of the vehicle 510. These protection points are labeled in FIG. 5 as a front left (FL) point, a front right (RF) point, a rear left (RL) point, and a rear right (RR) point. The protection points can be defined based on known outer dimensions of the body of the vehicle 510. For example, the controller can define the protection points by measuring designated distances from a center location 506 of the vehicle 510 along orthogonal (e.g., x and y) axes 502, 504. This center location can be located midway between the opposite ends of the vehicle along the axis and midway between the opposite sides of the vehicle along the axis. For example, the front protection points FL, FR can be located the same distance from the axis as the rear protection points RL, RR, and the right protection points FR, RR can be located the same distance from the axis 504 as the left protection points FL, RL. Optionally, the controller can define the protection points based on designated distances and angles from the center location. For example, the front right protection point FR can be a designated distance at a first angle in a counter-clockwise direction from the axis 502, the front left protection point FL can be the same or another designated distance at the same first angle in a clockwise direction from the axis (or at a second angle that is ninety degrees greater than the first angle in a counter-clockwise direction from the axis), the rear left protection point RL can be a designated distance at a third angle in a counter-clockwise direction from the axis, and the rear right protection point RR can be the same or another designated distance at the same first angle in a clockwise direction from the axis (or at a fourth angle that is ninety degrees greater than the third angle in a clockwise direction from the axis).

These designated distances can be increased axis for longer vehicles and/or for wider vehicles. Optionally, the designated angles may change for longer and/or wider vehicles. The protection points can be defined to be outside of the outer surfaces of the vehicle. As shown in FIG. 5, the front protection points FL, FR can be located in a two-dimensional plane that is in front of or intersects the outermost surface of the leading end of the vehicle. The rear protection points RL, RR can be located in a two-dimensional plane that is in front of or intersects the outermost surface of the opposite trailing end of the vehicle in one embodiment. The protection points can define an outer boundary of the vehicle. Entry of other objects into this outer boundary can result in collision with the vehicle.

The controller can define protection zones around the vehicle based on the locations of the protection points and/or the speed at which the vehicle is moving. In the illustrated example, three different types of protection zones are defined around the vehicle. These protection zones include a compulsory action zone 512, conditional action zones 514, and no-action change zones 516. Alternatively, fewer protection zones may be defined, more protection zones may be defined, fewer different types of protection zones may be defined, and/or more different types of protection zones may be defined. As described above, the different types of zones are associated with different responsive actions to be taken (or that are not taken) if another object is detected within different types of protection zones.

The controller can define the compulsory action zone as a surface area or a three-dimensional volume of space extending ahead of the leading end of the vehicle between the front protection points FR, FL, as shown in FIG. 5. This surface area can be disposed on the surface of the route being traveled by the vehicle or can be parallel to the route surface but elevated above the route surface by a designated distance (e.g., one half meter or another distance). The volume of space can extend from the route surface (or a plane that is parallel to the route surface) to a designated height above the route surface, such as the height of the vehicle above the route surface (or another height). The controller can define the compulsory action zone to extend ahead of the vehicle to outer ends of stop protection lines 524, which are described below.

The controller can define the no-action zones 516 as surface areas or three-dimensional volumes of space extending laterally outward from opposite sides of the vehicle (relative to a direction of travel 522 of the vehicle), as shown in FIG. 5. These surface areas can be disposed on the surface of the route being traveled by the vehicle or can be parallel to the route surface but elevated above the route surface by a designated distance. The volumes of space can extend from the route surface (or a plane that is parallel to the route surface) to the designated height above the route surface. The controller can define the no-action zones to outward from the sides of the vehicle to a designated distance, such as the length of the stop protection lines, described below.

The controller can define the conditional action zones as surface areas or three-dimensional volumes of space extending along the axis from the plane that bid tides the front protection points FL, FR (and the front end of the plane of the no-action zones) to distances of the stop protection lines. The controller also can define one of the conditional action zones as the surface area or three-dimensional volume of space extending along the axis from the plane that includes left protection points FL, RL to distances of the stop protection lines. The controller can define the other conditional action zone as the surface area or three-dimensional volume of space extending along the axis from the plane that includes right protection points FR, RR to distances of the stop protection lines. The conditional action zone that is disposed to the right side of the axis in FIG. 5 can be referred to as the first quadrant or quadrant one of the vehicle, while the other conditional action zone that is disposed to the left side of the axis in FIG. 5 can be referred to as the second quadrant or quadrant two of the vehicle.

As shown in FIG. 5, the protection zones do not overlap with each other. Alternatively, two or more of the protection zones may at least partially overlap with each other.

While the previous description focuses on the designated distances that are used to define the sizes of the protection zones being the lengths of the stop protection lines, alternatively, these designated distances can be the lengths of slow protection lines 520, which are described below.

The controller can define stop and slow protection lines 524, 520 as lines that linearly project from the leading edge of the vehicle in directions parallel to the axis and/or as lines that linearly project from the lateral sides of the vehicle in directions parallel to the axis. The leading edge of the vehicle can be the two-dimensional plane that includes the front protection points FL, FR while the vehicle is moving forward in the direction or can be the two-dimensional plane that includes the rear protection points RL, RR while the vehicle is moving rearward in a direction that is opposite of the direction. The lateral sides of the vehicle can be the two-dimensional planes on either side of the vehicle, with one plane including the left protection points FL, RL and the other plane including the right protection points FR, RR.

For example, the stop protection lines can project in directions parallel to the moving direction of the vehicle from the front protection points FR, FL to distances of the stop protection lines (described below), while the vehicle is moving forward. The stop protection lines can project in opposite directions from the rear protection points RR, RL to distances of the stop protection lines (described below), while the vehicle is moving backward. Additional stop protection lines optionally can project on one side of the vehicle in directions that are perpendicular to the moving direction from the right protection points FR, RR to distances of the stop protection lines. Additional stop protection lines optionally can project on the other side of the vehicle in directions that are perpendicular to the moving direction from the left protection points FL, RL to distances of the stop protection lines.

The slow protection lines can project in directions parallel to the moving direction of the vehicle from the front protection points FR, FL to distances of the slow protection lines (described below), while the vehicle is moving forward. The slow protection lines can project in opposite directions from the rear protection points RR, RL to distances of the slow protection lines (described below), while the vehicle is moving backward. Additional slow protection lines optionally can project on one side of the vehicle in directions that are perpendicular to the moving direction from the right protection points FR, RR to distances of the slow protection lines. Additional slow protection lines optionally can project on the other side of the vehicle in directions that are perpendicular to the moving direction from the left protection points FL, to distances of the slow protection lines.

The controller can define the lengths or distances of the protection lines based at least in part on the moving speed of the vehicle. The protection lines can be longer for faster moving speeds of the vehicle, and shorter for slower moving speeds of the vehicle. In one embodiment, the lengths of the protection lines are based at least in part on the stopping distance of the vehicle. For example, the stopping distance (sd) of the vehicle can be determined by the controller based on:

$$sd = vt + \frac{v^2}{2g(\textit{coeff of friction} + \textit{gradient})(\textit{brake ratio})}$$

where v represents the moving speed of the vehicle, t represents time to stop the vehicle, g represents gravitational acceleration, and (coeff of friction+gradient) represents the combined value of the coefficient of friction and the gradient on which the vehicle is traveling, and brake ratio is the braking ratio of the vehicle (e.g., the ratio of the braking force to the weight of the vehicle). Alternatively, the braking distance can have a defined, designated value that is not calculated, but that is obtained from several different distances associated with different moving speeds of the vehicle (e.g., default stopping distances for different vehicle speeds).

The length or distance of the stop protection lines can be equal to the length of the stopping distance in one embodiment. Alternatively, the length or distance of the stop protection lines can be a percentage of the stopping distance, such as 125%, 110%, 90%, or the like, of the stopping distance. The length of the slow protection lines can be equal to twice the length of the stopping distance in one embodiment. Alternatively, the length or distance of the slow protection lines can be another percentage of the stopping distance, such as 225%, 210%, 190%, or the like, of the stopping distance. As shown in FIG. 5, the slow protection lines extend farther from the vehicle than the stop protection lines.

Controllers of the detection units onboard other vehicles can similarly identify or define protection lines, 524 and/or protection zones 512, 514, 516. Because the vehicles may be different sizes and/or move at different speeds, the protection lines, 524 and/or zones 512, 514, 516 for different vehicles may have different sizes and/or shapes. The sizes and/or shapes of the protection lines, 524 and/or zones 512, 514, 516 for a vehicle may dynamically change (by the controller of the vehicle) due to changing speeds of the vehicle.

The protection lines and/or zones that are defined by the controllers can be monitored lines or zones, and not tangible objects. For example, a protection line and/or zone can define spatial locations that are monitored for other objects by a controller to avoid collision with a vehicle.

The controllers of the different detection units can communicate the protection lines and/or zones with each other. For example, the controllers onboard different vehicles can transmit the protection lines and/or zones for the respective vehicle to the controller of one or more other vehicles. Optionally, the controllers onboard different vehicles can broadcast the protection lines and/or zones for the respective vehicle to the controllers of other vehicles. In another example, the controllers onboard different vehicles can communicate the protection lines and/or zones for the respective vehicle to a central memory or database that is accessible by the controllers of other vehicles.

The controller of a first vehicle can monitor locations of other vehicles relative to the first vehicle using the protection lines and/or zones. The first vehicle can be referred to as a vehicle under test while the other vehicles can be referred to as monitored vehicles. For example, responsive to detecting that a protection line and/or a protection zone of a monitored vehicle intersects, enters into, and/or overlaps with the protection line and/or a protection zone of the test vehicle, the controller of the test vehicle can instruct the operator of the test vehicle to change movement of the test vehicle or can automatically change movement of the test vehicle to avoid collision with the monitored vehicle. This change in movement can be slowing or stopping the test vehicle, changing the direction in which the test vehicle is moving, and/or instructing the monitored vehicle to change movement.

Figure 6:
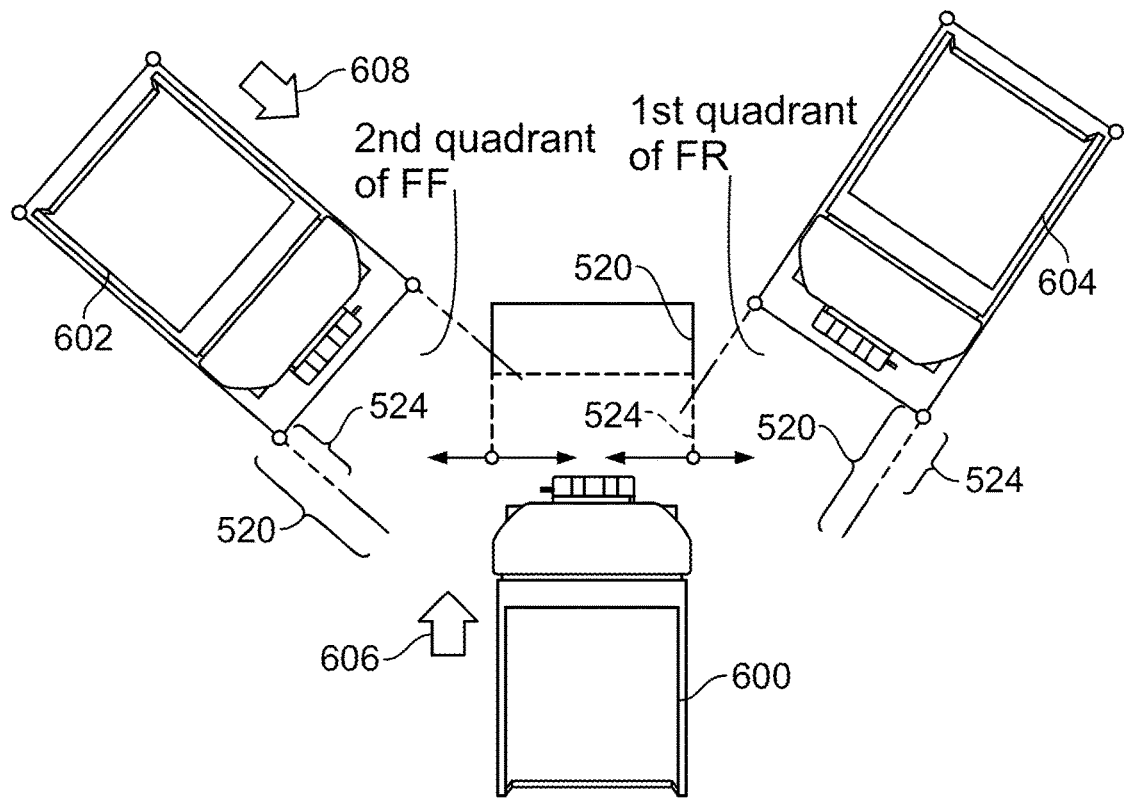
FIG. 6 illustrates one example of operation of the collision avoidance system.

FIG. 6 illustrates one example of operation of the collision avoidance system. In FIG. 6, first, second and third vehicles 600, 602, 604 are shown, with each vehicle representing one of the vehicles shown in FIG. 5. The first vehicle 600 may be a test vehicle, while the other vehicles are monitored vehicles. The first vehicle may move in a first direction of travel 606 and the second vehicle 602 may move in a different, second direction of travel 608. The slow and stop protection lines of the vehicles are shown in FIG. 6.

The controller of the first vehicle monitors the protection zones 512, 514 to determine if any other vehicles or protection line or zone of another vehicle enters the zones. The controller determines whether any protection zone or protection line of the other vehicles intersects, crosses over, enters, or at least partially overlaps the first or second quadrant of the first vehicle. The first quadrant is the front right conditional protection zone and the second quadrant is the front left conditional protection zone, as described above.

The controller of the first vehicle can instruct the operator of the first vehicle to stop movement of the first vehicle or can automatically stop movement of the first vehicle responsive to any stop protection line of the first vehicle intersecting or crossing over any stop protection line of another vehicle. But, the controller of the first vehicle can instruct the operator of the first vehicle to slow down movement of the first vehicle or can automatically slow down movement of the first vehicle responsive to any slow protection line of the first vehicle intersecting or crossing over any stop protection line or any slow protection line of another vehicle. If the controller determines that any stop protection line intersects or crosses over a slow protection line of another vehicle then the controller of the first vehicle may not instruct the operator to slow or stop movement of the first vehicle, and the controller of the first vehicle may not automatically slow or stop movement of the first vehicle.

In the illustrated example, the stop protection line of the first vehicle on the right side of the first vehicle intersects the slow protection line on the right side of the third vehicle. In response to detecting this intersection, the controller of the first vehicle can instruct the operator to stop movement of the first vehicle or can automatically stop movement of the first vehicle. Or, the controller of the first vehicle can instruct the operator to stop movement of the first vehicle and can automatically stop movement of the first vehicle responsive to the operator not stopping the first vehicle within a designated time limit or distance limit.

Additionally, the controller of the first vehicle may determine that the slow protection line 520 on the left side of the first vehicle intersects the slow protection line 520 on the left side of the vehicle 602. In response to detecting this intersection, the controller can instruct the operator to slow movement of the first vehicle or can automatically slow movement of the first vehicle. Or, the controller of the first vehicle can instruct the operator to slow movement of the first vehicle and can automatically slow movement of the first vehicle responsive to the operator not slowing the first vehicle to at least a designated speed within a designated time limit or distance limit.

Figure 7:
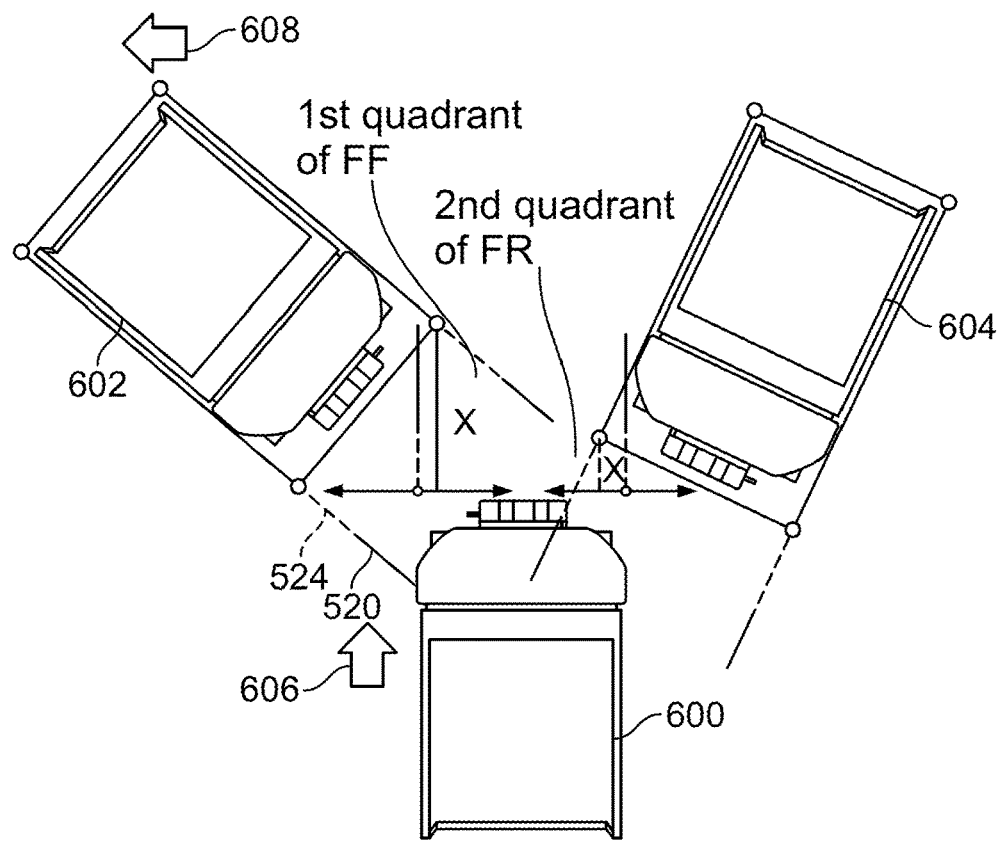
FIG. 7 illustrates another example of operation of the collision avoidance system.

FIG. 7 illustrates another example of operation of the collision avoidance system. The controller of the first vehicle can determine whether any protection point FR, FL, RR, RL of one of the second or third vehicles enters or intersects either of the protection zones of the first vehicle. Responsive to determining that a protection line 520, 524 or protection zone 512, 514 of another vehicle enters a protection zone of the first vehicle, the controller can calculate a closing distance x between the vehicles.

This closing distance x can be the shortest linear distance between either of the front protection points FR, FL of the second and third vehicle and the two-dimensional vertical plane that includes the front protection points FR, FL of the first vehicle. Optionally, this closing distance x can be the shortest linear distance between either of the rear protection points RR, RL of the other vehicle and the two-dimensional vertical plane that includes the front protection points FR, FL of the first vehicle if the first vehicle is approaching the back end of the second or third vehicle and/or that vehicle is backing up. In another example, this closing distance x can be the shortest linear distance between either of the front protection points RR, RL of the vehicle 602, 604 and the two-dimensional vertical plane that includes the rear protection points RR, RL of the first vehicle if the first vehicle is backing up and/or is approaching the back end of the first vehicle.

The controller can instruct the operator to stop movement of the first vehicle (and automatically stop movement if the operator is not responsive within the time or distance limit) responsive to the closing distance x being less than a designated stop limit $L_{stop}$, where:

$$L_{stop} = sd_t + \cos(rel\ heading) * sd_m$$

where $sd_t$ represents the stopping distance of the test first vehicle, $sd_m$ represents the stopping distance of the other vehicle, and rel heading is the relative heading of the other vehicle to the first vehicle. The relative heading can be the angle between the headings of the first vehicle and the other vehicle being monitored. The stopping distances $sd_t$ and $sd_m$ of the vehicles can be the lengths of the respective stop protection lines.

The controller can instruct the operator to slow movement of the first vehicle (and automatically slow movement if the operator is not responsive within the time or distance limit) responsive to the closing distance x being less than a designated slowing limit $L_{slow}$, where:

$$L_{slow} = sld_t + \cos(rel\ heading) * sld_m$$

where $sld_t$ represents the slowing distance of the test first vehicle, $sld_m$ represents the slowing distance of the monitored other vehicle, and rel heading is the relative heading of the other vehicle to the first vehicle. The slowing distances $sld_t$ and $sld_m$ of the vehicles can be the lengths of the respective slow protection lines.

If the closing distance x is less than the slowing limit $L_{slow}$, then the controller directs and/or automatically slows movement of the first vehicle. If the closing distance x is less than the stopping limit $L_{stop}$, then the controller directs and/or automatically stops movement of the first vehicle.

Figure 8:
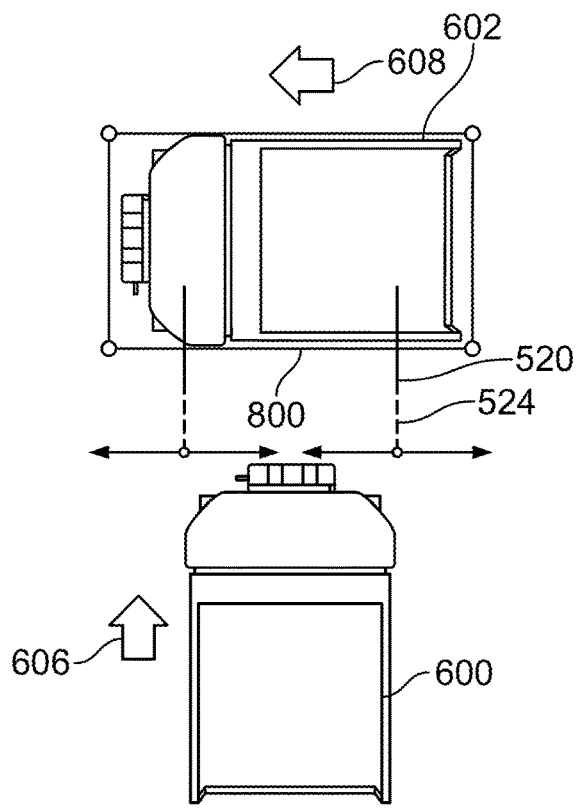
FIG. 8 illustrates another example of operation of the collision avoidance system.

FIG. 8 illustrates another example of operation of the collision avoidance system. The controller of the first vehicle can determine whether a protection line of the first vehicle intersects the body of another vehicle. The controller can make this determination by deciding whether the slow or stop protection lines of the first vehicle cross a two-dimensional plane 800 that includes both protection points of the vehicle 602 on one side of the second vehicle. For example, the controller can identify one side of the second vehicle as a vertical plane that includes the left protection points FL, RL of the second vehicle (as shown in FIG. 8) and/or the other side of the second vehicle as another vertical plane that includes the right protection points FR, RR of the second vehicle.

The controller of the first vehicle can determine if the slow or stop protection lines of the first vehicle crosses over this plane between the protection points on one side of the second vehicle. If the slow protection line of the first vehicle intersects this plane of the second vehicle, then the controller of the first vehicle can instruct the operator to slow movement of the first vehicle (and automatically slow movement if the operator is not responsive within the time or distance limit). If the stop protection line of the first vehicle intersects this plane of the second vehicle, then the controller of the first vehicle can instruct the operator to stop movement of the first vehicle (and automatically stop movement if the operator is not responsive within the time or distance limit). In the illustrated example, the controller determines that the slow protection line intersects the side plane 800 of the second vehicle. Accordingly, the controller directs the operator to slow movement of the first vehicle (and automatically slows movement if the operator is not responsive within the time or distance limit).

Figure 9A:
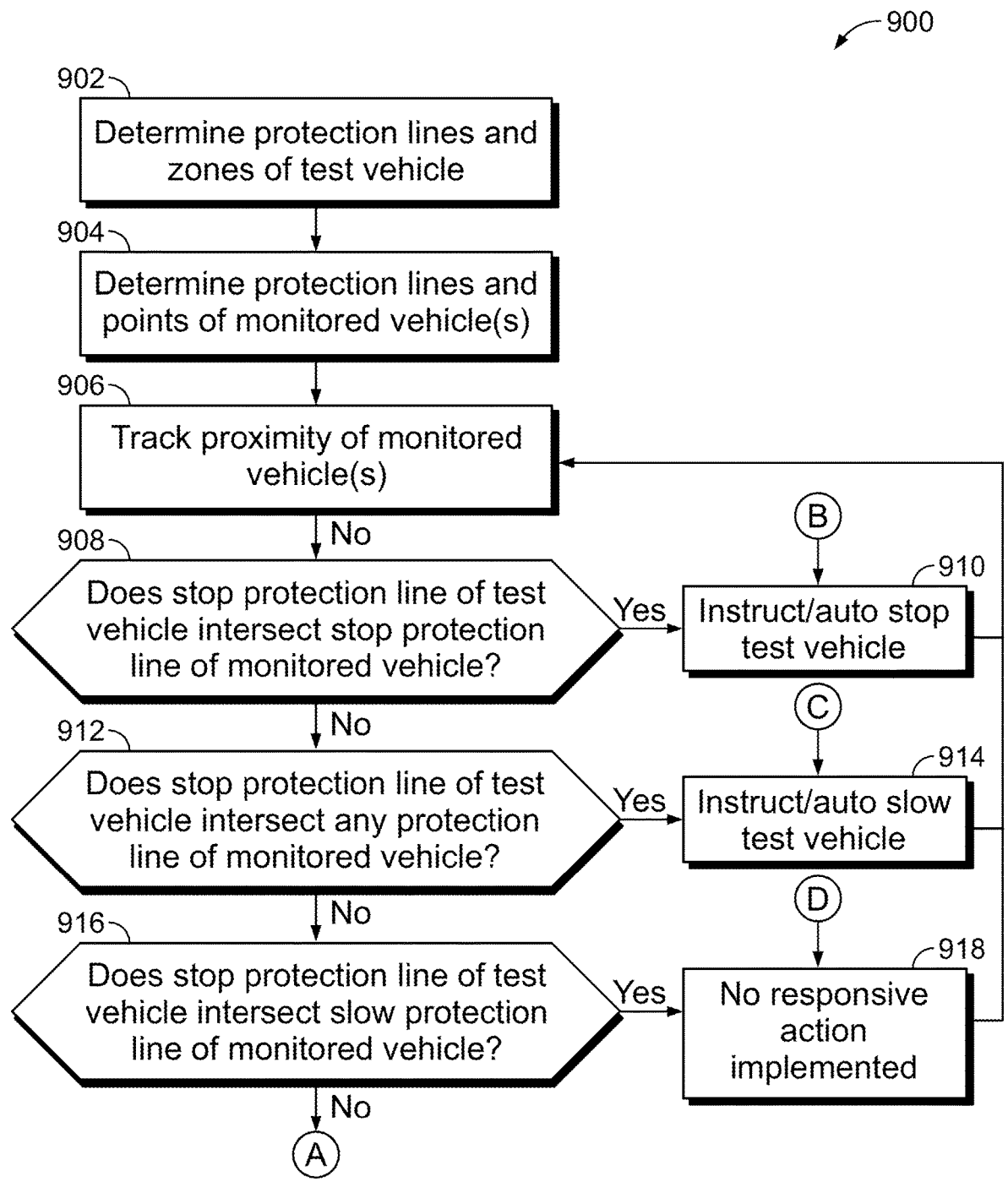
FIGS. 9A and 9B illustrate a flowchart of one embodiment of a method for avoiding collisions between vehicles.
Figure 9B:
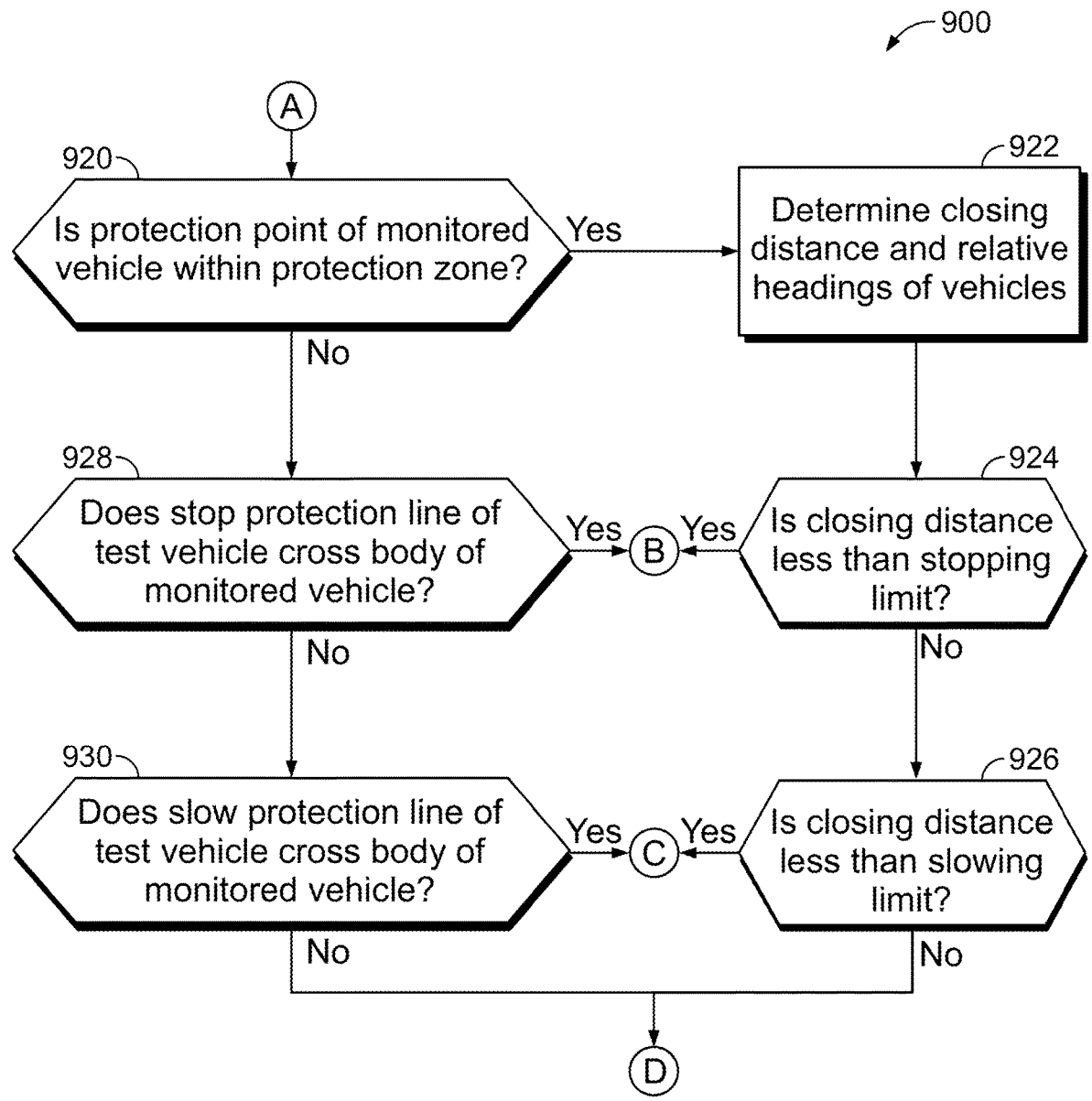

FIGS. 9A and 9B illustrate a flowchart of one embodiment of a method 900 for avoiding collisions between vehicles. The method 900 can represent the operations performed by the detection units described herein. While the method 900 is described as used to avoid collision between vehicles, the method 900 also can be used to avoid collision between other types of vehicles, between a vehicle and a non-vehicular object, or the like. Additionally, the method 900 is described as a sequence of decisions to determine whether to implement responsive actions to avoid collisions. But the decisions may be performed in a sequence other than the sequence shown in the flowchart. The decisions may be performed concurrently and/or simultaneously instead of sequentially in another embodiment.

At 902, protection lines and zones of a test vehicle are determined. The controller can identify the slow and stop protection lines of a test vehicle, as well as the compulsory, conditional, and/or no-action zones of the test vehicle. At 904, the protection lines and/or points of one or more other vehicles are determined. For example, the protection points and lines of monitored vehicles are identified, as described above. At 906, the proximity of one or more of the monitored vehicles is tracked. The detection unit can monitor how close the protection points and/or lines are from the protection lines and/or zones of the test vehicle.

At 908, a determination is made as to whether a stop protection line of the test vehicle intersects a stop protection line of a monitored vehicle. If this intersection of stop protection lines is detected, then the vehicles may be in threat of an imminent collision. As a result, flow of the method 900 can proceed toward 910. Otherwise, the vehicles may not be in threat of an imminent collision, and flow of the method 900 can proceed toward 912.

At 910, the test vehicle is manually or automatically stopped. The controller can instruct the operator of the test vehicle via an output device (e.g., a speaker, light, display, or the like) to stop movement of the test vehicle. Alternatively, the controller can automatically stop movement of the test vehicle without operator intervention. In another embodiment, the controller can change movement of the test vehicle, such as by changing a heading of the test vehicle to avoid collision with the monitored vehicle. Flow of the method 900 can then return toward 906 to continue tracking the proximity of other vehicles, or the method 900 can terminate.

Returning to the decision made at 908, if no stop protection line of the test vehicle intersects a stop protection line of a monitored vehicle, then, at 912, a determination is made as to whether a slow protection line of the test vehicle intersects a stop or slow protection line of a monitored vehicle. If either slow protection line of the test vehicle intersects a stop or slow protection line of a monitored vehicle, then the test and monitored vehicles may be moving toward an eventual collision. As a result, flow of the method 900 can proceed toward 914. Otherwise, the vehicles may not be traveling toward a collision, and flow of the method 900 can proceed toward 916.

At 914, the test vehicle is manually or automatically slowed. The controller can instruct the operator of the test vehicle via an output device to slow movement of the test vehicle. Alternatively, the controller can automatically slow movement of the test vehicle without operator intervention. In another embodiment, the controller can change movement of the test vehicle, such as by changing a heading of the test vehicle to avoid collision with the monitored vehicle. Flow of the method 900 can then return toward 906 to continue tracking the proximity of other vehicles, or the method 900 can terminate.

Returning to the decision made at 912, if no slow protection line of the test vehicle intersects a protection line of a monitored vehicle, then, at 916, a determination is made as to whether a stop protection line of the test vehicle intersects a slow protection line of a monitored vehicle. If a stop protection line of the test vehicle intersects a slow protection line of a monitored vehicle, then the test and monitored vehicles may still not be near enough to pose a collision risk. As a result, flow of the method 900 can proceed toward 918. Otherwise, flow of the method 900 can proceed toward 920 (FIG. 9B).

At 918, no responsive action is implemented to change movement of the test vehicle. For example, the test and monitored vehicles may not be at risk for collision, so movement of the test vehicle can continue without slowing the test vehicle, stopping the test vehicle, or changing a heading of the test vehicle. Flow of the method 900 can then return toward 906 to continue tracking the proximity of other vehicles, or the method 900 can terminate.

At 920, a determination is made as to whether any protection point of the monitored vehicle is within a protection zone of the test vehicle. For example, the controller of the test vehicle can determine whether any of the protection points FR, FL, RR, RL of the monitored vehicle is within any conditional or compulsory protection zone 512, 514 of the test vehicle. If a protection point is within one of these protection zones, then the vehicles may be at risk of an imminent collision. As a result, flow of the method 900 can proceed toward 922. If a protection point is not within one of these protection zones, then the vehicles may not be at risk of an imminent collision. As a result, flow of the method 900 can proceed toward 928.

At 922, a closing distance between the test and monitored vehicle is determined, along with a relative heading of the vehicles, as described above. At 924, a determination is made as to whether this closing distance is less than a stopping limit of the test vehicle. If the closing distance is less than the stopping limit, then the vehicles may be at risk of an imminent collision. As a result, flow of the method 900 can proceed toward 910 to stop movement of the test vehicle, as described above. Otherwise, the vehicles may not be in threat of an imminent collision, and flow of the method 900 can proceed toward 926.

At 926, a determination is made as to whether this closing distance is less than a slowing limit of the test vehicle. If the closing distance is less than the slowing limit, then the vehicles may be moving toward an eventual collision. As a result, flow of the method 900 can proceed toward 914 to slow movement of the test vehicle, as described above. Otherwise, the vehicles may not be moving toward a collision, and flow of the method 900 can proceed toward 918, described above.

Returning to the description of the decision made at 920, if no protection point of a monitored vehicle is within a protection zone of the test vehicle, then flow of the method 900 can proceed toward 928. At 928, a determination is made as to whether a stop protection line of the test vehicle crosses the body of a monitored vehicle. For example, the controller can determine if a stop protection line of the test vehicle crosses or intersects a plane extending from and including the front and rear protection points on the same side of the monitored vehicle. If a stop protection line crosses or intersects this plane, then the vehicles may be at risk of an imminent collision. As a result, flow of the method 900 can proceed toward 910 to stop movement of the test vehicle, as described above. If no stop protection line of the test vehicle crosses or intersects this plane, then the vehicles may not be at risk of an imminent collision but may be moving toward a collision. As a result, flow of the method 900 can flow toward 930.

At 930, a determination is made as to whether a slow protection line of the test vehicle crosses the body of a monitored vehicle. For example, the controller can determine if a stop protection line of the test vehicle crosses or intersects the plane extending from and including the front and rear protection points on the same side of the monitored vehicle. If a slow protection line crosses or intersects this plane, then the vehicles may be moving toward a collision. As a result, flow of the method 900 can proceed toward 914 to slow movement of the test vehicle, as described above. If no slow protection line of the test vehicle crosses or intersects this plane, then the vehicles may not be moving toward a collision. As a result, flow of the method 900 can flow toward 918.

Embodiments of the collision avoidance systems and methods described herein can reduce or eliminate the number of false alarms relative to some known collision avoidance systems. The collision avoidance systems described herein can reduce false alarms by defining protection lines in the direction of movement of the test vehicle and by defining conditional and compulsory slow and stop protection zones around protection points of the vehicle. The controller can stop the vehicle as last resort but can use early detection of a collision hazard to slow the vehicle before stopping movement of the vehicle. The controller can define go-slow or stop zones around the vehicle so that unnecessary alarms can be reduced based on the position and heading of the other vehicle.

In one embodiment, a collision avoidance system further includes, or communicates with, a map of static elements. This may supplement the functionality designed to prevent a vehicle from colliding with another mobile object. For example, if a vehicle operates in an area having a man-made structure or a natural terrain feature the route can be planned taking into account the known location of the object. Man-made features may include a wall, curb, building, post, bridge, powerline towers, and other permanent or semi-permanent objects that constitute infrastructure. Natural terrain features may include rivers, hills, cliffs, sandbars, and the like. Related, the route may be constrained by the transportation medium in that an automobile may require a road as the route, and a locomotive may require rails. Calculations that determine stopping and slowing distances may include information such as: loaded or unloaded state of the vehicle, condition of the wheels, condition of the route, grade of the route, and the like.

In one embodiment, a vehicle control system includes a control unit that can be disposed onboard a vehicle to control movement of the vehicle and one or more transceiver devices that can emit an electromagnetic (EM) pulse and a radio frequency (RF) signal from the vehicle. The one or more transceiver devices are that can emit the RF signal with an identity of the vehicle included in the RF signal. Responsive to a receiver unit disposed of the vehicle in a mine receiving the EM pulse and the RF signal, the control unit can determine a distance between the vehicle and the receiver unit based on the EM pulse and the RF signal that are received, and to communicate a signal to the one or more transceiver devices based on the distance. The control unit also can change the movement of the vehicle based on the distance.

Optionally, the control unit can one or more of slow the movement of the vehicle, stop the movement of the vehicle, or change a direction of the movement of the vehicle based on the signal received from the receiver unit. The one or more transceiver devices can receive the signal from the receiver unit disposed onboard another vehicle. The one or more transceiver devices can receive the signal from the receiver unit carried by a person located in the mine.

In one embodiment, a vehicle control system includes a detection unit that can determine a proximity of a monitored vehicle to a first vehicle and a controller that can determine first protection lines that linearly project from the first vehicle and second protection lines that linearly project from the monitored vehicle. The first protection lines are determined based on a moving speed of the first vehicle. The second protection lines are determined based on a moving speed of the monitored vehicle. The controller can direct the first vehicle to change movement of the first vehicle responsive to intersection of one or more of the first protection lines with one or more of the second protection lines.

Optionally, the first protection lines that are determined can include longer first slow protection lines and shorter first stop protection lines. The second protection lines that are determined can include longer second slow protection lines and shorter second stop protection lines. The controller can direct the first vehicle to stop the movement of the first vehicle responsive to detection of intersection of at least one of the first stop protection lines with at least one of the second stop protection lines. The controller can direct the first vehicle to slow the movement of the first vehicle responsive to detection of intersection of at least one of the first slow protection lines with any of the second slow protection lines or the second stop protection lines.

The controller can determine the second protection lines as linearly extending away from protection points associated with a body of the monitored vehicle, and the controller can define protection zones outside of the first vehicle and extending between the first protection lines. The controller can determine whether one or more of the protection points of the monitored vehicle enter one or more of the protection zones of the first vehicle. The controller can determine a closing distance of the monitored vehicle and a relative heading between the first vehicle and the monitored vehicle responsive to determining that the one or more protection points of the monitored vehicle entered the one or more protection zones of the first vehicle. The controller can direct the first vehicle to slow or stop the movement of the first vehicle based on the closing distance, the relative heading, and one or more of a stopping or slowing limit of the test vehicle.

In one embodiment, a method for avoiding collision between vehicles is provided. The method includes determining a proximity of a monitored vehicle to a first vehicle and determining first protection lines that linearly project from the first vehicle. The first protection lines are determined based on a moving speed of the first vehicle. The method also includes determining second protection lines that linearly project from the monitored vehicle. The second protection lines are determined based on a moving speed of the monitored vehicle. The method also includes changing movement of the first vehicle responsive to intersection of one or more of the first protection lines with one or more of the second protection lines.

Optionally, determining the first protection lines can include determining longer first slow protection lines and shorter first stop protection lines. Determining the second protection lines can include determining longer second slow protection lines and shorter second stop protection lines. Changing the movement of the first vehicle can include stopping the movement of the first vehicle responsive to detection of intersection of at least one of the first stop protection lines with at least one of the second stop protection lines.

Changing the movement of the first vehicle can include slowing the movement of the first vehicle responsive to detection of intersection of at least one of the first slow protection lines with any of the second slow protection lines or the second stop protection lines. Determining the second protection lines can include determining linear projections of the second protection lines that extend away from protection points associated with a body of the monitored vehicle. The method optionally can include determining protection zones outside of the first vehicle and extending between the first protection lines. The method also can include determining whether one or more of the protection points of the monitored vehicle enter one or more of the protection zones of the first vehicle.

Optionally, the method includes determining a closing distance of the monitored vehicle and a relative heading between the first vehicle and the monitored vehicle responsive to determining that the one or more protection points of the monitored vehicle entered the one or more protection zones of the first vehicle. Changing the movement of the first vehicle can include slowing or stopping the movement of the first vehicle based on the closing distance, the relative heading, and one or more of a stopping or slowing limit of the first vehicle.

In one embodiment, a vehicle control system includes a detection unit that can determine a proximity of a monitored vehicle to a first vehicle and a controller that can determine first protection lines that linearly project from the first vehicle and second protection lines that linearly project from the monitored vehicle. The first protection lines are determined based on a moving speed of the first vehicle. The second protection lines are determined based on a moving speed of the monitored vehicle. The controller can direct the first vehicle to change movement of the first vehicle responsive to intersection of one or more of the first protection lines with one or more of the second protection lines.

In one embodiment, a method for avoiding collision between vehicles is provided. The method includes determining a proximity of a monitored vehicle to a first vehicle and determining a first protection lines that linearly project from the first vehicle. The first protection lines are determined based on a moving speed of the first vehicle. The method includes determining second protection lines that linearly project from the monitored vehicle. The second protection lines are determined based on a moving speed of the monitored vehicle. The method includes changing movement of the first vehicle responsive to intersection of one or more of the first protection lines with one or more of the second protection lines.

In an embodiment, a system includes a vehicle having an emitter that can emit a high RF signal synchronously with at least one EM pulse. The system includes a receiver unit located remote from the vehicle. The receiver unit includes a magnetic field receiver, an RF transceiver, and a processing module coupled to the RF transceiver and the magnetic field receiver. The receiver unit can receive the high RF signal and at least one EM pulse from the vehicle and to determine a proximity of the vehicle to the receiver unit based on at least one of the high RF signal or the at least one EM pulse.

In an embodiment, a method includes, with an emitter on board a first vehicle, emitting a high RF signal synchronously with at least one EM pulse. The method further includes, with a receiver unit located remote from the first vehicle (the receiver unit includes a magnetic field receiver, an RF transceiver, and a processing module coupled to the RF transceiver and the magnetic field receiver), receiving the high RF signal and the at least one EM pulse from the first vehicle. The method further includes, with the receiver unit, determining a proximity between the first vehicle and the receiver unit based on at least one of the high RF signal or the EM pulse.

In an embodiment, a system includes a receiver unit having a magnetic field receiver, an RF transceiver, and a processing module coupled to the RF transceiver and the magnetic field receiver. The RF transceiver can receive a high RF signal from a vehicle that is remote from the receiver unit. The magnetic field receiver can receive at least one EM pulse from the vehicle. The processing module can verify that emission of the high RF signal and the at least one EM pulse from the vehicle occurred synchronously. The processing module is further configured, responsive to verification that the emission occurred synchronously, to determine a proximity of the vehicle to the receiver unit based on at least one of the high RF signal or the at least one EM pulse. The processing module can, responsive to verification that the emission did not occur synchronously, reject the high signal and the at least one EM pulse for use in determining the proximity.

In an embodiment, a system includes a vehicle having an on-board navigation system that can determine a position of the vehicle within a reception area without external references. The system also includes at least one beacon positioned at a location within the reception area along a route over which the vehicle travels. The at least one beacon stores location data of the at least one beacon within the reception area. The vehicle can wirelessly receive the location data from the at least one beacon when the vehicle passes within range of the at least one beacon.

Figure 10:
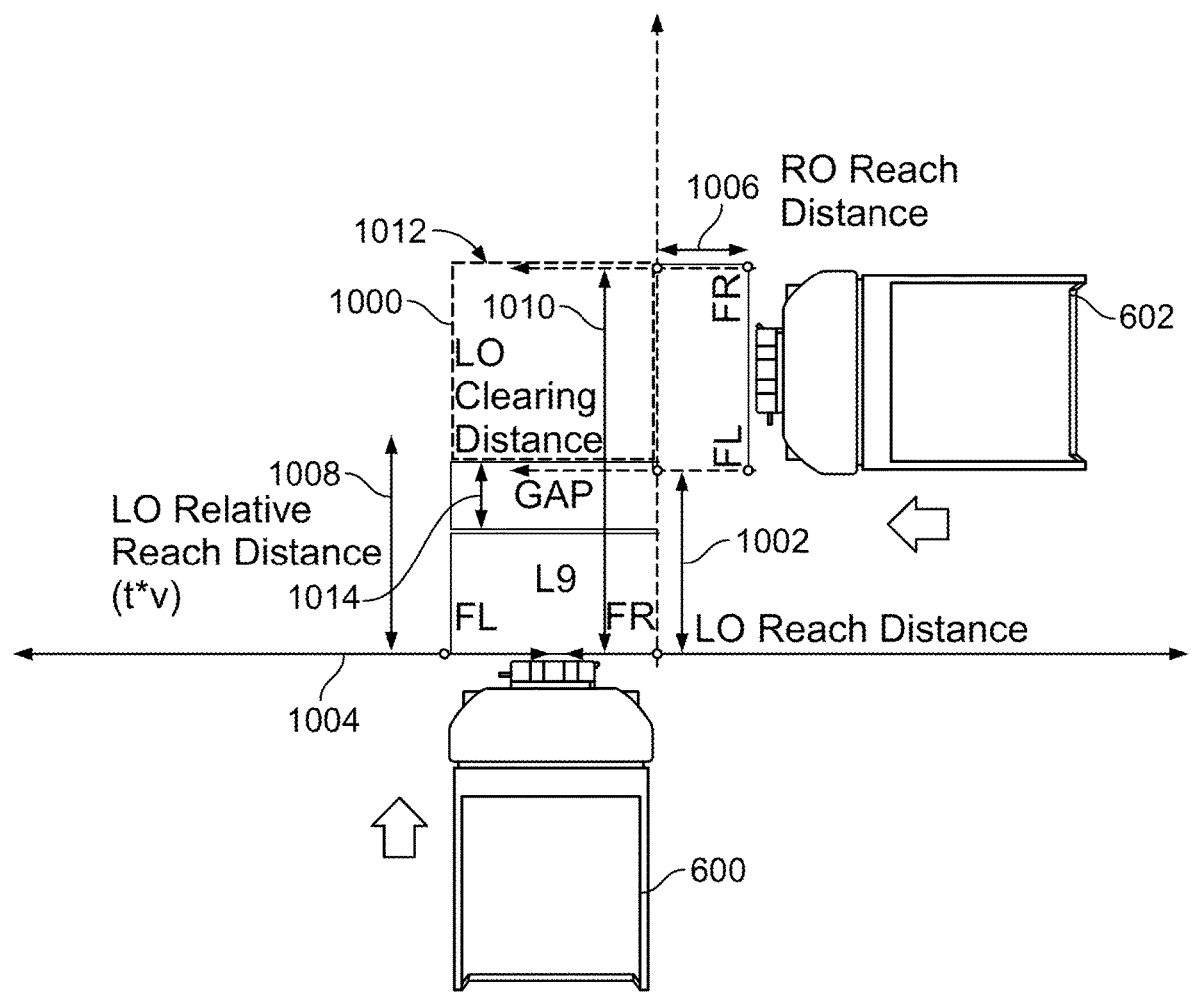
FIG. 10 illustrates another embodiment of operation of the vehicle collision avoidance system described above.

FIG. 10 illustrates another embodiment of operation of the vehicle collision avoidance system described above. The controller may be disposed onboard a first vehicle system 600 (also referred to as a local object or LO) and can forecast or calculate an upcoming intersection area 1000 of projected paths of the first vehicle system and a second vehicle system 602 (also referred to as a remote object or RO). The upcoming intersection area can be based on current movements and locations of the first vehicle system and the second vehicle system. The intersection area can represent the area on a surface being traveled by the first and second vehicle systems that both the vehicle systems will travel over if the vehicle systems keep moving on current headings or paths. The size of the intersection area can be a product of the widths of the vehicle systems.

The controller can forecast where the intersection area is located by calculating a reach distance 1002 of the first vehicle system ("LO Reach Distance" in FIG. 10). The reach distance is calculated as a distance from a leading edge 1004 of the first vehicle system to the intersection area. In one embodiment, the reach distance is calculated as the distance (e.g., the shortest distance) between a protection point of the first vehicle system and the intersection area. The protection point can be the front protection point (front right FR or front left FL protection points, as described above) that is closer to the second vehicle system than the other front protection point. In the example shown in FIG. 10, the protection point used by the controller of the first vehicle system to calculate the LO reach distance is the FR protection point as the second vehicle system is on the right side of the first vehicle system.

The controller of the first vehicle system optionally can calculate a reach distance 1006 of the second vehicle system ("RO Reach Distance" in FIG. 10). The RO reach distance can be calculated or estimated as the distance (e.g., shortest distance) between a protection point of the second vehicle system and the intersection area. Similar to the LO reach distance, the RO reach distance can be calculated as the shortest distance from the FR or protection point of the second vehicle system (e.g., the closest protection point to the first vehicle system and the intersection area).

The controller of the first vehicle system can calculate a relative reach distance 1008 for the first vehicle system ("LO Relative each Distance" in FIG. 10). The relative reach distance for the first vehicle system can represent the distance that the first vehicle system will travel before the second vehicle system reaches the intersection area. In one embodiment, the relative reach distance can be calculated as a product of the velocity of the first vehicle system and a time before the second vehicle system will reach the intersection area. The time before the second vehicle system reaches the intersection area can be estimated or calculated by the controller as the RO reach distance divided by the velocity of the second vehicle system.

The controller can calculate a clearing distance 1010 of the second vehicle system ("LO Clearing Distance" in FIG. 10). The LO clearing distance can represent the minimum or threshold distance that the first vehicle system needs to travel within the time before the second vehicle system reaches the intersection area to avoid activating an alarm, as described herein. The LO clearing distance can be calculated or estimated as the distance from the leading edge of the first vehicle system (or either of the front protection points FR, FL) to a far edge 1012 of the intersection area (e.g., the farthest edge from the first vehicle system). Alternatively, the LO clearing distance can be calculated or estimated as the distance from the opposite (e.g., trailing) edge of the first vehicle system to the far edge 1012 of the intersection area.

The controller can implement or initiate one or more responsive actions based on one or more of the distances described above. As one example, if the first and second vehicle systems are both headed toward the intersection area such that the vehicle systems will both at least partially occupy the intersection area at the same time, then the controller can instruct an operator to reduce speed of the first vehicle system or can automatically reduce the speed of the first vehicle system. The speed can be reduced by reducing throttle and/or engaging brakes of the first vehicle system to decelerate by an amount that is based on the current velocity of the first vehicle system, the reach distance, and a designated gap distance 1014.

The designated gap distance can be a default value (e.g., a fraction of the size or length of the first vehicle system, such as 20% of the length of the first vehicle system) or can have a value that changes based on the moving speed of the first vehicle system (e.g., the gap distance is 20% of the length of the first vehicle system while the first vehicle system is moving slower than a lower threshold speed, 50% of the length of the first vehicle system while the first vehicle system is moving faster than the lower threshold speed but slower than an intermediate threshold speed, 75% of the length of the first vehicle system while the first vehicle system is moving faster than the intermediate threshold speed but slower than an upper threshold speed, 100% of the length of the first vehicle system while the first vehicle system is moving faster than the upper threshold speed, and so on).

The controller can decelerate the first vehicle system at a rate that is proportional to a square of the velocity of the first vehicle system and/or inversely proportional to a difference between the LO reach distance and the designated gap. For example, the rate at which the controller decelerates can be calculated as:

$$D = \frac{v^2}{2(LO \text{ reach distance} - \text{gap})}$$

where D represents the rate of speed reduction of the first vehicle system (e.g., the deceleration of the first vehicle system), v represents the moving speed of the first vehicle system toward the intersection area, and gap represents the designated gap. While the calculated value of D may be a positive value, the controller may decrease the speed of the first vehicle system by rate that is the negative value of D.

If a difference between the LO reach distance and the designated gap is shorter than the designated gap, then the first vehicle system may be too close to the intersection area to avoid colliding with the second vehicle system unless an emergency action is taken. For example, the controller can automatically stop movement of the first vehicle system to prevent a collision with the second vehicle system. But, if the controller determines that the LO relative reach distance of the first vehicle system is longer than the LO clearing distance, then no action may need to be taken. For example, the controller can determine that the first vehicle system will be through and clear of the intersection area before the second vehicle system reaches the intersection area such that no alarm, stoppage, or other responsive action is needed. Alternatively, the controller may automatically activate an alarm when the first and second vehicle systems are headed toward the intersection area and, responsive to determining that the LO relative reach distance of the first vehicle system is longer than the LU clearing distance, the controller can deactivate the alarm and/or prevent automatic slowing or stoppage of the first vehicle system.

Figure 11:
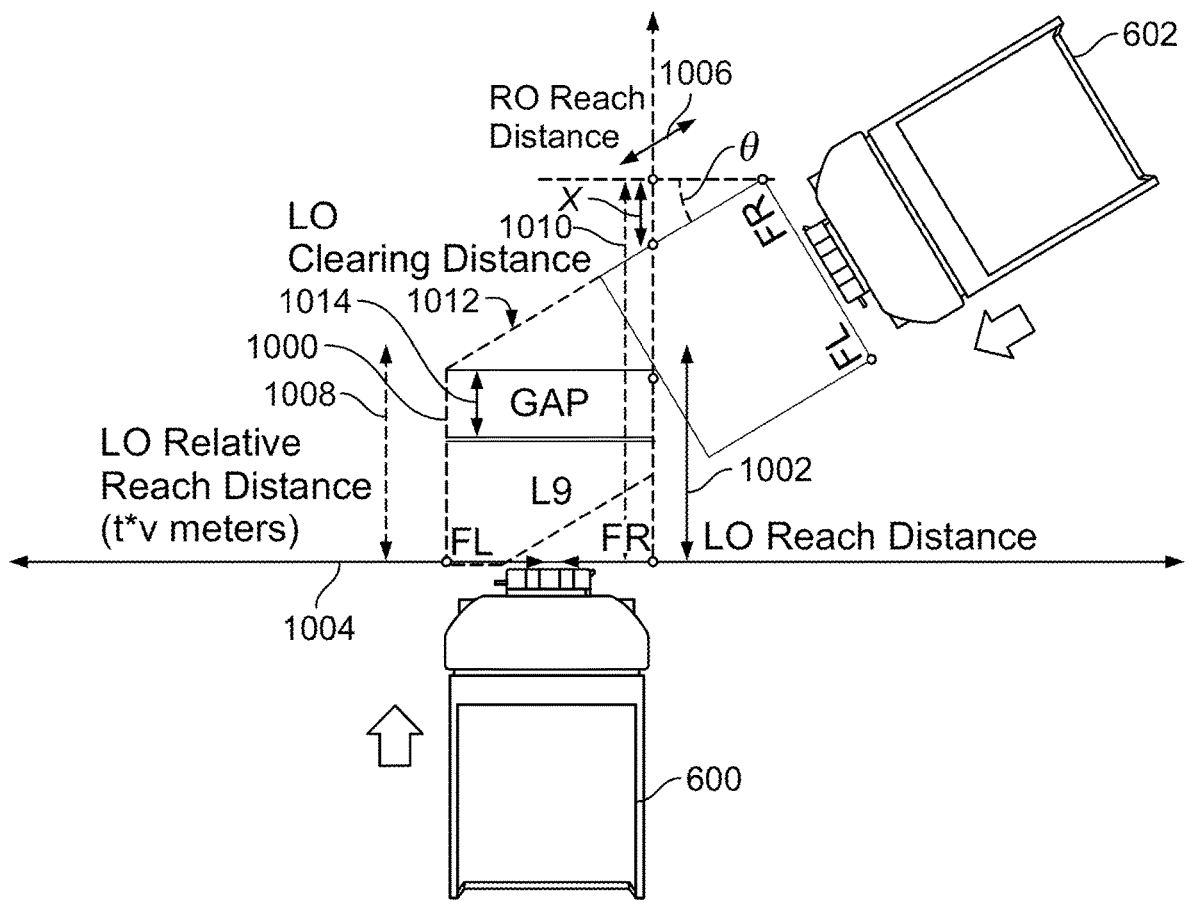
FIG. 11 illustrates another example where the projected paths of the vehicle systems are obliquely angled to each other (e.g., an angle of approach of the second vehicle system is acute)

The projected paths of the vehicle systems in FIG. 10 are orthogonal (e.g., perpendicular) to each other. Alternatively, the projected paths of the vehicle systems may not be orthogonal to each other. FIG. 11 illustrates another example where the projected paths of the vehicle systems are obliquely angled to each other (e.g., an angle of approach of the second vehicle system is acute) and FIG. 12 illustrates an example where the projected paths of the vehicle systems are acutely angled to each other (e.g., the angle of approach of the second vehicle system is oblique).

In the scenario of FIG. 11, the controller may calculate an allowance distance x that is used to compensate some of the other distances calculated by the controller to determine whether to slow or stop the first vehicle system or end an alarm. The allowance distance v can be calculated or estimated as a product between the RO reach distance and $\sin(\Theta)$, where $\Theta$ is an angle of approach of the second vehicle system. The angle of approach can be the angle between the heading (e.g., direction of movement) of the second vehicle system and the leading edge of the first vehicle system (or a line that is parallel to the leading edge of the first vehicle system), as shown in FIG. 11. The controller can add the allowance distance x to the LU clearing distance that is calculated as described above when the angle of approach of the second vehicle system is less than ninety degrees (e.g., is an acute angle). As described above, if the LO relative reach distance is longer than the LO clearing distance (increased by the allowance distance x), then any alarm may be deactivated or turned off, and the controller can allow the first vehicle system to continue moving without stopping or slowing down. If the difference between the reach distance and the designated gap is shorter than the designated gap, then the controller may automatically stop movement of the first vehicle system. Otherwise, the controller can reduce the speed of the first vehicle system by the deceleration rate D, as described above.

Figure 12:
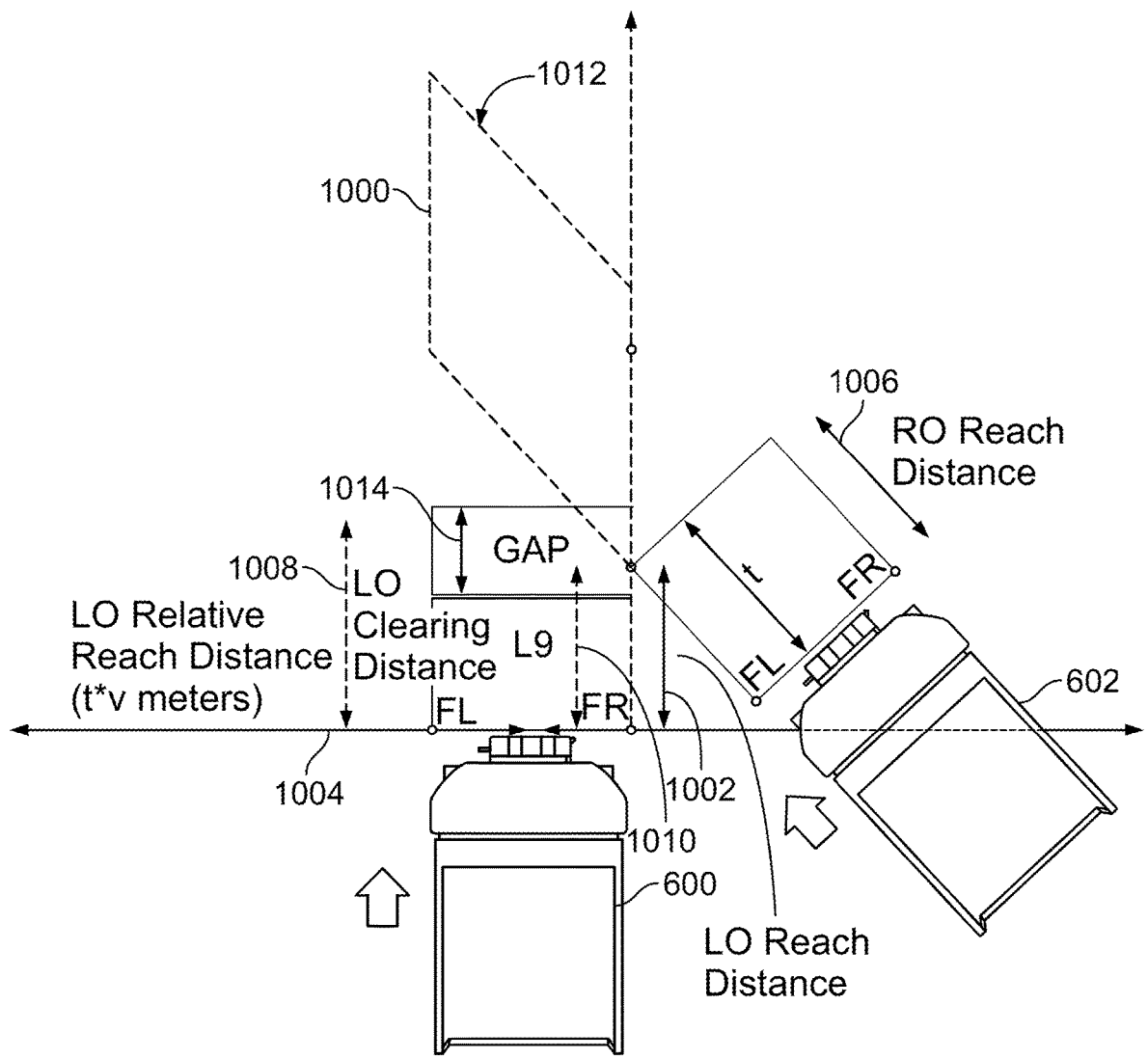
FIG. 12 illustrates an example where the projected paths of the vehicle systems are acutely angled to each other (e.g., the angle of approach of the second vehicle system is oblique)

In the scenario of FIG. 12, the controller may use the same distances described ire connection with FIG. 10 to determine whether to slow or stop the first vehicle system or end an alarm. For example, if the difference between the LO reach distance and the designated gap is shorter than the designated gap, then the first vehicle system may be too close to the intersection area to avoid colliding with the second vehicle system unless an emergency action is taken. For example, the controller can automatically stop movement of the first vehicle system to prevent a collision with the second vehicle system. But, if the controller determines that the LO relative reach distance of the first vehicle system is longer than the LO clearing distance, then no action may need to be taken. For example, the controller can determine that the first vehicle system will be through and clear of the intersection area before the second vehicle system reaches the intersection area such that no alarm, stoppage, or other responsive action is needed. Alternatively, the controller may automatically activate an alarm when the first and second vehicle systems are headed toward the intersection area and, responsive to determining that the LO relative reach distance of the first vehicle system is longer than the LO clearing distance, the controller can deactivate the alarm and/or prevent automatic slowing or stoppage of the first vehicle system.

Figure 13:
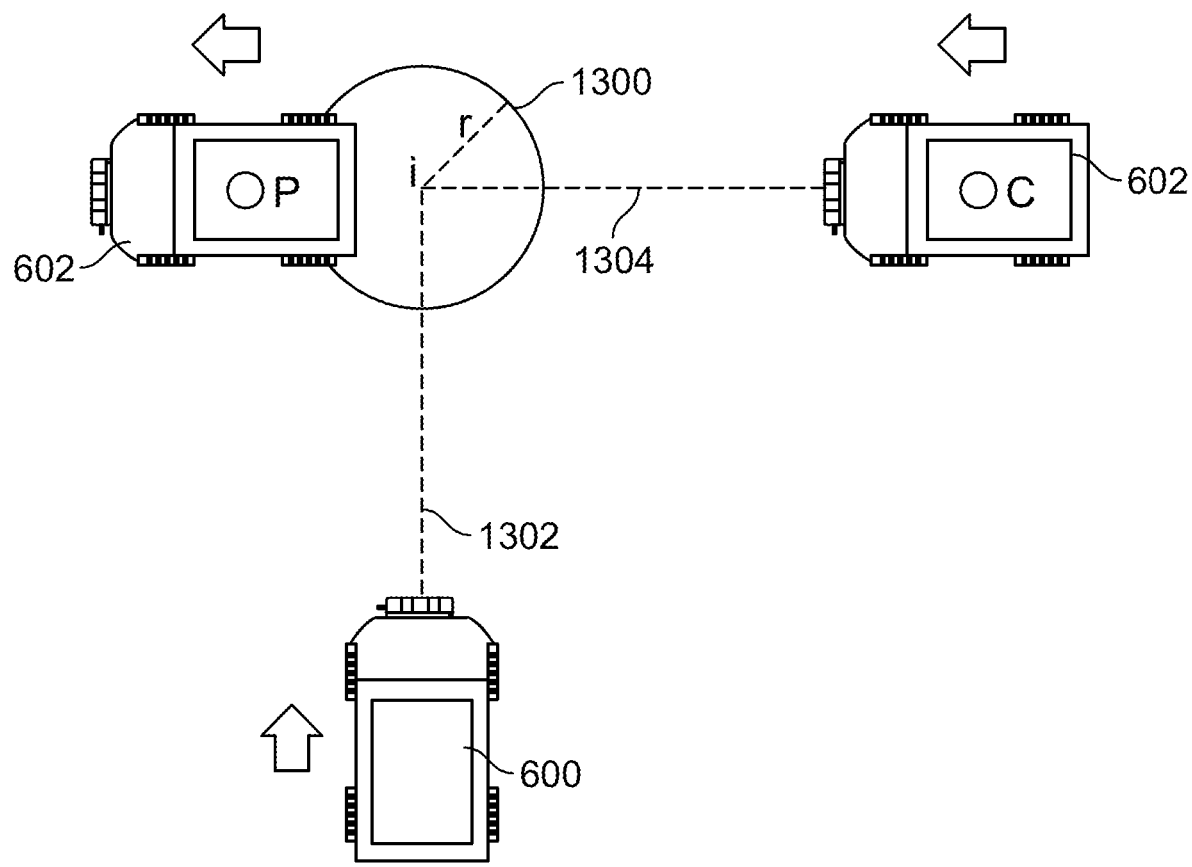
FIG. 13 illustrates another embodiment of operation of the vehicle collision avoidance system.

FIG. 13 illustrates another embodiment of operation of the vehicle collision avoidance system described above. The system can calculate a bubble area 1300 ahead of a direction of travel of the vehicle system 600 and predict whether the other vehicle system 602 will be in the bubble area at the same time as the vehicle system 600. For example, the controller onboard the local vehicle system 600 can identify the bubble area as an area that is ahead of the local vehicle system. If the movement of the remote vehicle system 602 indicates that the local and remote vehicle systems will both at least partially occupy the bubble area at the same time (e.g., concurrently), then the controller can implement one or more responsive actions described herein to avoid a collision between the local and remote vehicle systems. In the illustrated example, the bubble area is a circular area but alternatively may have another shape.

The controller can determine an intersection point i as the location where a direction of travel (or heading) 1302 of the local vehicle system intersects a direction of travel (or heading) 1304 of the remote vehicle system. The intersection point can be determined by assuming that both the local and remote vehicle systems will continue traveling along linear paths to the intersection point. The controller can identify the location of the bubble area as being centered at the intersection point, as shown in FIG. 13. The controller can determine a size of the bubble area using a designated safe radius r of the area. This radius can be a fixed, unchanging value, or can change based on one or more characteristics of the vehicle system(s) and/or operational parameters of the vehicle system(s).

With respect to the characteristics of the vehicle systems, the radius of the bubble area may increase for larger local and/or remote vehicle systems (e.g., wider and/or longer vehicle systems) and decrease for smaller local and/or remote vehicle systems (e.g., narrower and/or shorter vehicle systems). The radius of the bubble area may increase for heavier local and/or remote vehicle systems and decrease for lighter local and/or remote vehicle systems. The radius of the bubble area may increase for local and/or remote vehicle systems carrying hazardous cargo (e.g., flammable and/or explosive cargo) and decrease for local and/or remote vehicle systems carrying non-hazardous cargo (e.g., ore, no cargo, etc.). Increasing the radius for bigger and/or heavier vehicle systems, and/or for vehicle systems carrying hazardous cargo, can reduce the likelihood of collisions between the vehicle systems, as collisions between these vehicle systems may be more likely and/or dangerous, while avoiding having too large of a bubble area for vehicle systems that are less likely to collide and/or present a reduced danger if collision occurs.

With respect to the operational parameters of the vehicle systems, the radius of the bubble area may increase for faster moving speeds of the local and/or remote vehicle systems. Increasing the radius for faster moving vehicle systems can reduce the likelihood of collisions between the vehicle systems, as collisions between these vehicle systems may be more likely and/or dangerous, while avoiding having too large of a bubble area for vehicle systems that are moving slower and therefore less likely to collide and/or present a reduced danger if collision occurs.

The controller can calculate the location and size of the bubble area, and then examine a current location C and moving speed of the remote vehicle system. From this information, the controller can determine a predicted location P of the remote vehicle system at a time when the local vehicle system enters or is within the bubble area. This time can be referred to as an entry or occupancy time. The controller can calculate a predicted location P of the remote vehicle system at this occupancy time. If this predicted location is within the bubble area at the occupancy time, then the controller can initiate one or more responsive actions described herein.

For example, the controller can determine how far the remote vehicle system is from the edge of the bubble area by subtracting the radius of the bubble area from the distance from the current location of the remote vehicle system and the intersection of the moving paths (or the center of the bubble area). The controller can divide this distance by the moving speed of the remote vehicle system to determine when the remote vehicle system will reach the edge of the bubble area. The controller can make a similar calculation but for the local vehicle system. If the controller determines that both the local and remote vehicle systems will be in or enter into the bubble area at the same time, then the controller can implement one or more responsive actions (e.g., activate an alarm, automatically slow or stop movement of the local vehicle system, etc.). Otherwise, the controller can allow the local vehicle system to continue moving without implementing the responsive action(s).

Figure 14:
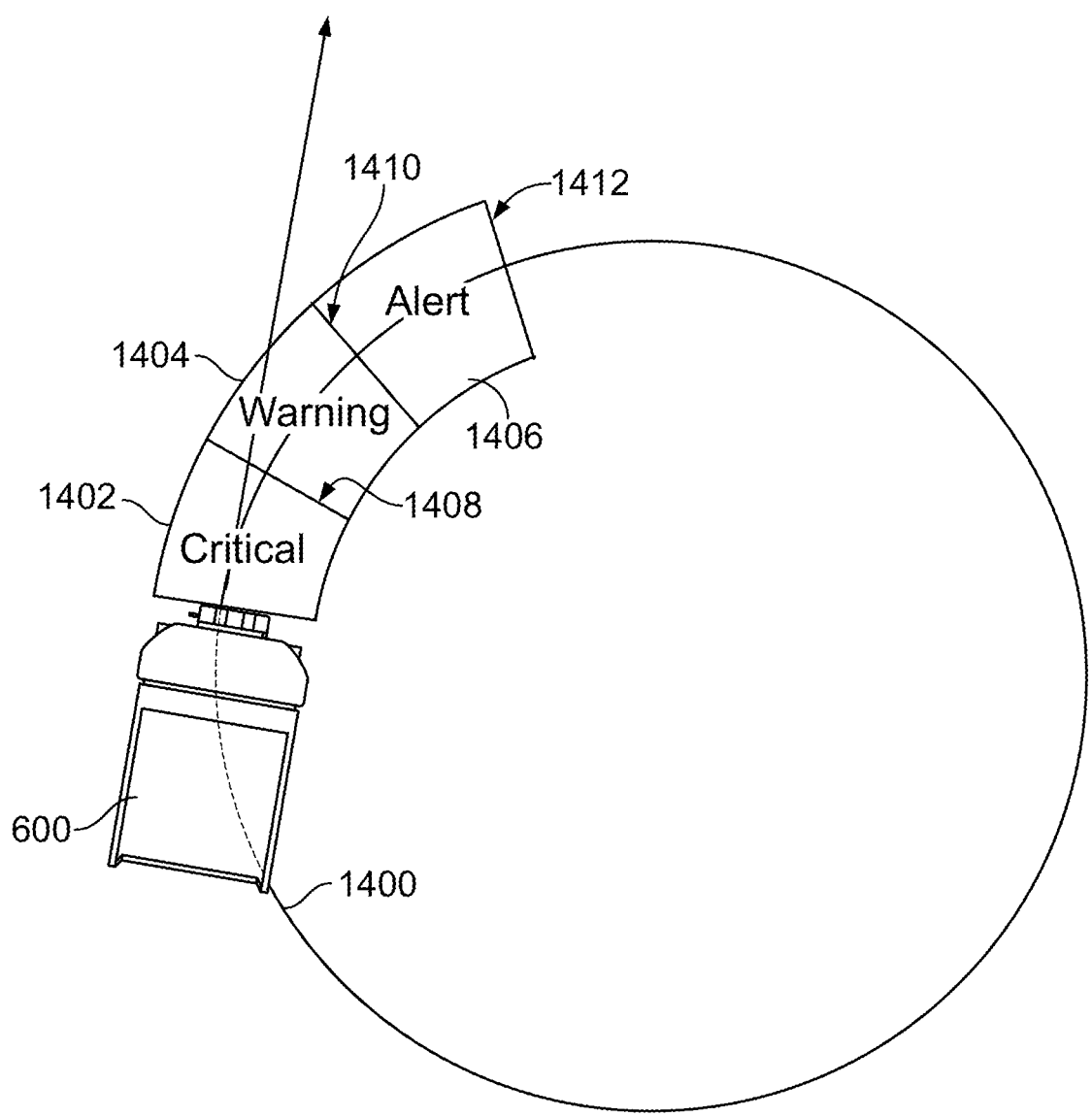
FIG. 14 illustrates another embodiment of operation of the vehicle collision avoidance system.

FIG. 14 illustrates another embodiment of operation of the vehicle collision avoidance system described above. The system is described in connection with FIGS. 10 through 13 as predicting whether a collision is imminent or likely to occur when the vehicle systems are moving along linear paths (or are assumed to be moving along linear paths). Additionally or alternatively, the collision avoidance system can determine whether a collision is likely to occur or will occur when one or both of the vehicle systems are moving along a curved path 1400.

The controller of the local vehicle system 600 can calculate or estimate an angular velocity of the local vehicle system along the curved path. As one example, the controller can obtain sampled locations of the local vehicle system from a GPS receiver. The controller can calculate headings of the local vehicle system from these sampled locations. The angular velocity of the local vehicle system can be calculated as a rate of change in these headings (e.g., in terms of degrees per second that the headings are changing). The angular velocity that is calculated can then be used by the controller to calculate a circumference of a circle along which the curved path extends. For example, the circumference of the circle along which the curved path extends can be calculated by multiplying the moving speed of the local vehicle system by three hundred sixty degrees by the angular velocity of the local vehicle system.

The controller can then use this circumference of the circle along which the curved path extends to determine different zones 1402, 1404, 1406 ahead of the local vehicle system. The closest zone 1402 can be referred to as a critical zone, a farther zone 1404 can be referred to as a warning zone, and a farther zone 1406 can be referred to as an alert zone. Each of these zones can extend the same or a different length along the circle calculated by the controller. The length of each zone along the circle can be based on the speed at which the local vehicle system is moving. For example, the critical zone may extend a length along the circle to an end 1408, where the length is a sum of a designated stopping distance, the designated gap distance (described above), and a product of a designated operator reaction time and the moving speed of the local vehicle system. The operator reaction time may be a set or variable time period required for an operator to actuate the brakes of the local vehicle system after seeing an object (e.g., the remote vehicle system) ahead of the local vehicle system). The designated stopping distance may be a set distance or may be calculated as a distance that the local vehicle system will continue moving after the brakes of the local vehicle system have been applied. Optionally, the stopping distance can be calculated as the moving speed of the local vehicle system divided by a deceleration of the local vehicle system (e.g., the deceleration rate described above).

The warning zone can extend from the end of the critical zone (the end of the critical zone that is farthest from the local vehicle system) by a length along the circle to another end 1410. The length of the warning zone extends from the end 1408 to the end 1410 along the circle, where the length is a product of a designated operator warning time and the moving speed of the local vehicle system. The operator warning time may be a set or variable time period that is longer than the reaction time. The alert zone can extend from the end of the warning zone (the end of the warning zone that is farthest from the local vehicle system) by a length along the circle to another end 1412. The length of the alert zone from the end 1410 to the end 1412 along the circle, where the length is a product of a designated operator alert time and the moving speed of the local vehicle system. The operator alert time may be a set or variable time period that is longer than the warning time.

Optionally, the controller can determine the zones as different distances along the curved path. The distance of the critical zone can extend from the leading edge of the local vehicle system and be the sum of the stopping distance, the designated gap, and the product of the critical reaction time and the speed of the local vehicle system. The distance of the warning distance can extend from the leading edge of the local vehicle system and be a sum of the critical zone distance and the product of the warning reaction time and the speed of the local vehicle system. The distance of the alert distance can extend from the leading edge of the local vehicle system and be a sum of the warning zone distance and the product of the alert reaction time and the speed of the local vehicle system.

The controller can determine whether the remote vehicle system is within one or more of these zones (or will be within one or more of these zones) and implement one or more responsive actions. As described above, responsive to determining that the remote vehicle system is within (or will be within) the critical zone, the controller can automatically stop movement of the local vehicle system. Responsive to determining that the remote vehicle system is within (or will be within) the warning zone, the controller can activate an alarm and optionally automatically slow movement of the local vehicle system (e.g., by the deceleration rate described above). Responsive to determining that the remote vehicle system is within (or will be within) the alert zone, the controller can activate an alarm to warn the operator (hut not automatically slow or stop the local vehicle system).

Figure 15:
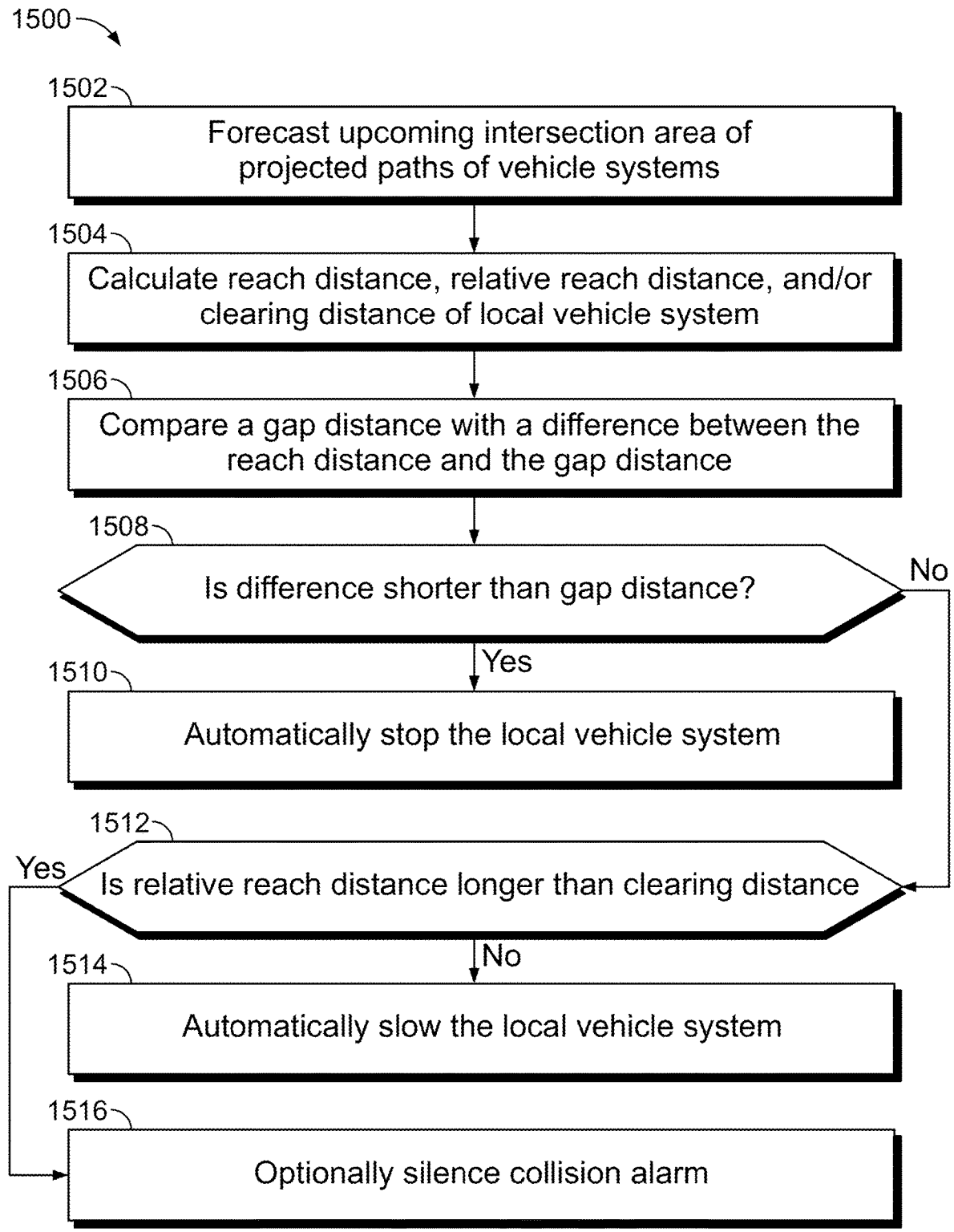
FIG. 15 illustrates a flowchart of one example of a method for avoiding collisions between a vehicle system and at least one other object.

FIG. 15 illustrates a flowchart of one example of a method 1500 for avoiding collisions between a vehicle system and at least one other object (such as another vehicle system). The method can represent operations performed by the collision avoidance systems described herein. At 1502, an upcoming intersection area of projected paths of vehicle systems is forecasted. For example, an area over which both vehicle systems will travel over if the vehicle systems continue moving along current headings of the vehicle systems can be determined. At 1504, a reach distance, relative reach distance, and/or clearing distance of at least one of the vehicle systems are determined. These distances can be calculated for the local vehicle system as described above. At 1506, a gap distance is compared with a difference between the gap distance and the reach distance. This gap distance can be a designated distance, such as a stopping distance, of the local vehicle system.

At 1508, if this difference is smaller than the gap distance, then an emergency action may need to be taken to avoid a collision between the vehicle systems. For example, if the difference is smaller than the gap distance, then this can indicate that the local vehicle system is closer to the intersection area than the gap distance. This can be too close to avoid collision with the remote vehicle system unless an emergency action is taken. As a result, flow of the method can proceed toward 1510. Otherwise, the local vehicle system may be farther from the intersection area than the designated gap distance and flow of the method can proceed toward 1512.

At 1510, the local vehicle system may be automatically stopped. For example, the controller may engage the brakes of the vehicle system as soon as possible or practical to prevent a collision between the local vehicle system and a remote object (e.g., the remote vehicle system). Flow of the method can terminate or return to one or more other operations (e.g., 1502).

At 1512, a decision is made as to whether the relative reach distance is longer than the clearing distance. If the relative reach distance is longer than the clearing distance, then the local vehicle system will be clear of the intersection area before the remote vehicle system reaches the intersection area. As a result, the local vehicle system may continue moving without having to implement one or more responsive actions. Flow of the method optionally can proceed toward 1516 or may terminate. At 1516, any alarm that is currently active can be silenced or otherwise turned off. But, if the relative reach distance is not longer than the clearing distance, then the local vehicle system may not be through the intersection area before the remote vehicle system reaches the intersection area. As a result, flow of the method can proceed toward 1514 from 1512.

At 1514, the local vehicle system slows down. The controller can automatically reduce the speed of the vehicle system at a deceleration rate described above, or by another amount. The local vehicle system may be slowed so that the remote vehicle system has more time to pass through and clear the intersection area or to otherwise avoid a collision between the vehicle systems. Alternatively, the controller can change the heading or direction in which the local vehicle system is moving to avoid the collision. Flow of the method can terminate or can return to another operation (e.g., 1502 or 1504).

Figure 16:
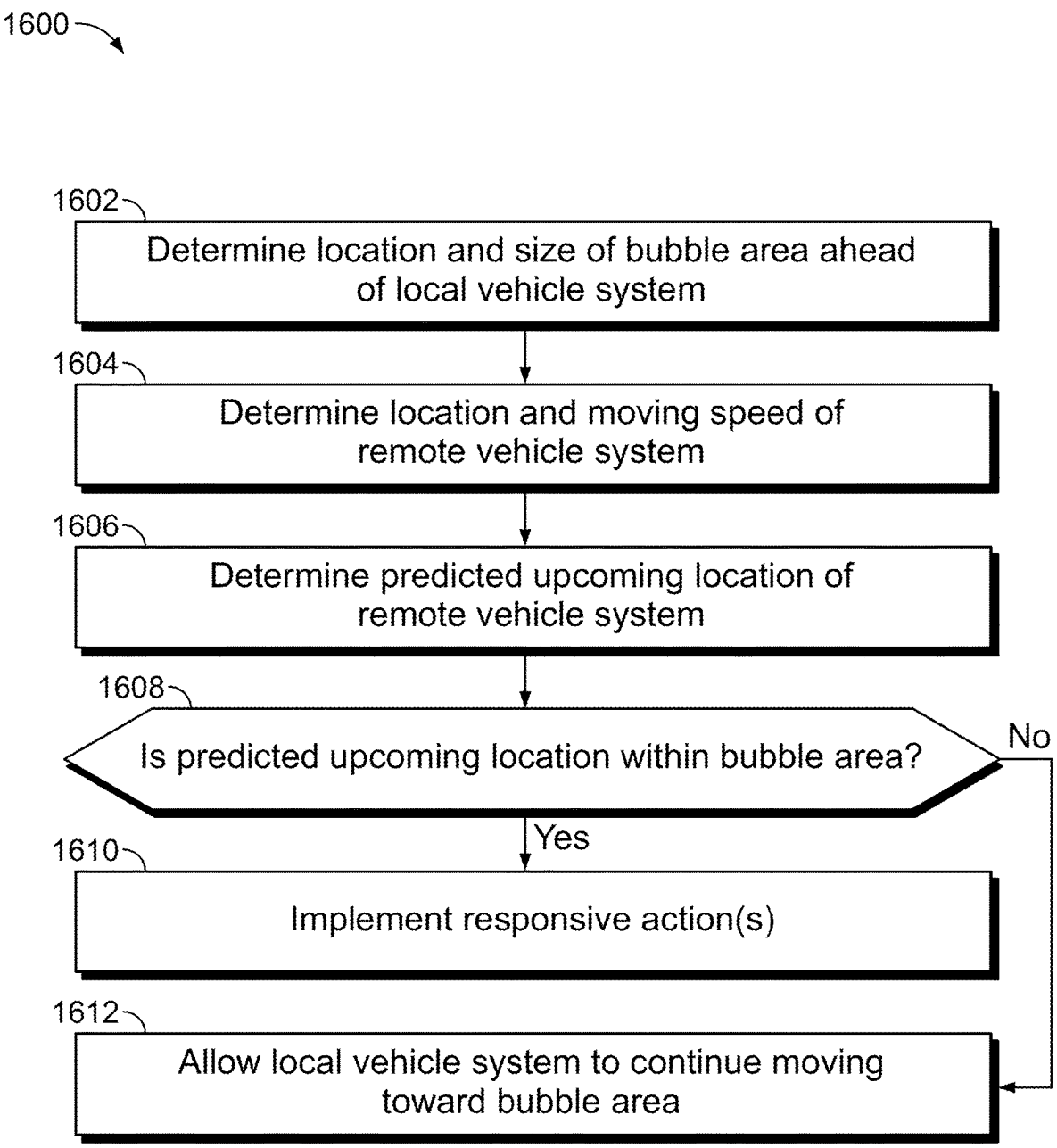
FIG. 16 illustrates a flowchart of another example of a method for avoiding collisions between a vehicle system and at least one other object.

FIG. 16 illustrates a flowchart of another example of a method 1600 for avoiding collisions between a vehicle system and at least one other object (such as another vehicle system). The method can represent operations performed by the collision avoidance systems described herein. At 1602, a location and size of a bubble area ahead of a local vehicle system is determined. The location can be determined by identifying an intersection between headings of the local and remote vehicle systems. The size can be a default size or can vary based on vehicle characteristics and/or operational parameters, as described above.

At 1604, the location and moving speed of the remote vehicle system can be determined. At 1606, a predicted upcoming location of the remote vehicle system can be determined. For example, the controller of the local vehicle system can determine how far the local vehicle system is from the bubble area and how long it will be before the local vehicle system reaches the bubble area based on the moving speed of the local vehicle system. The controller can determine how much farther the remote vehicle system will move based on this amount of time and how fast the remote vehicle system is moving. This determined location of the remote vehicle system can be the predicted upcoming location.

At 1608, a decision is made as to whether the predicted upcoming location of the remote vehicle system is within the bubble area. If the predicted upcoming location is within the bubble area, then this can indicate that a collision between the vehicle systems may or will occur unless some responsive action is implemented before the collision occurs. As a result, flow of the method can proceed toward 1610. But, if the predicted upcoming location is not within the bubble area, then this can indicate that a collision between the vehicle systems is unlikely to occur or will not occur so long as the vehicle systems continue moving in the same directions and at the same speeds. As a result, flow of the method can proceed toward 1612.

At 1610, one or more responsive actions are implemented to prevent or avoid the collision. For example, the local vehicle system may automatically slow or stop, or may change direction. Flow of the method can then terminate or return to one or more other operations (e.g., 1602 or 1604). At 1612, the local vehicle system can continue moving toward the bubble area without slowing or stopping. Flow of the method can then terminate or return to one or more other operations (e.g., 1602 or 1604).

Figure 17:
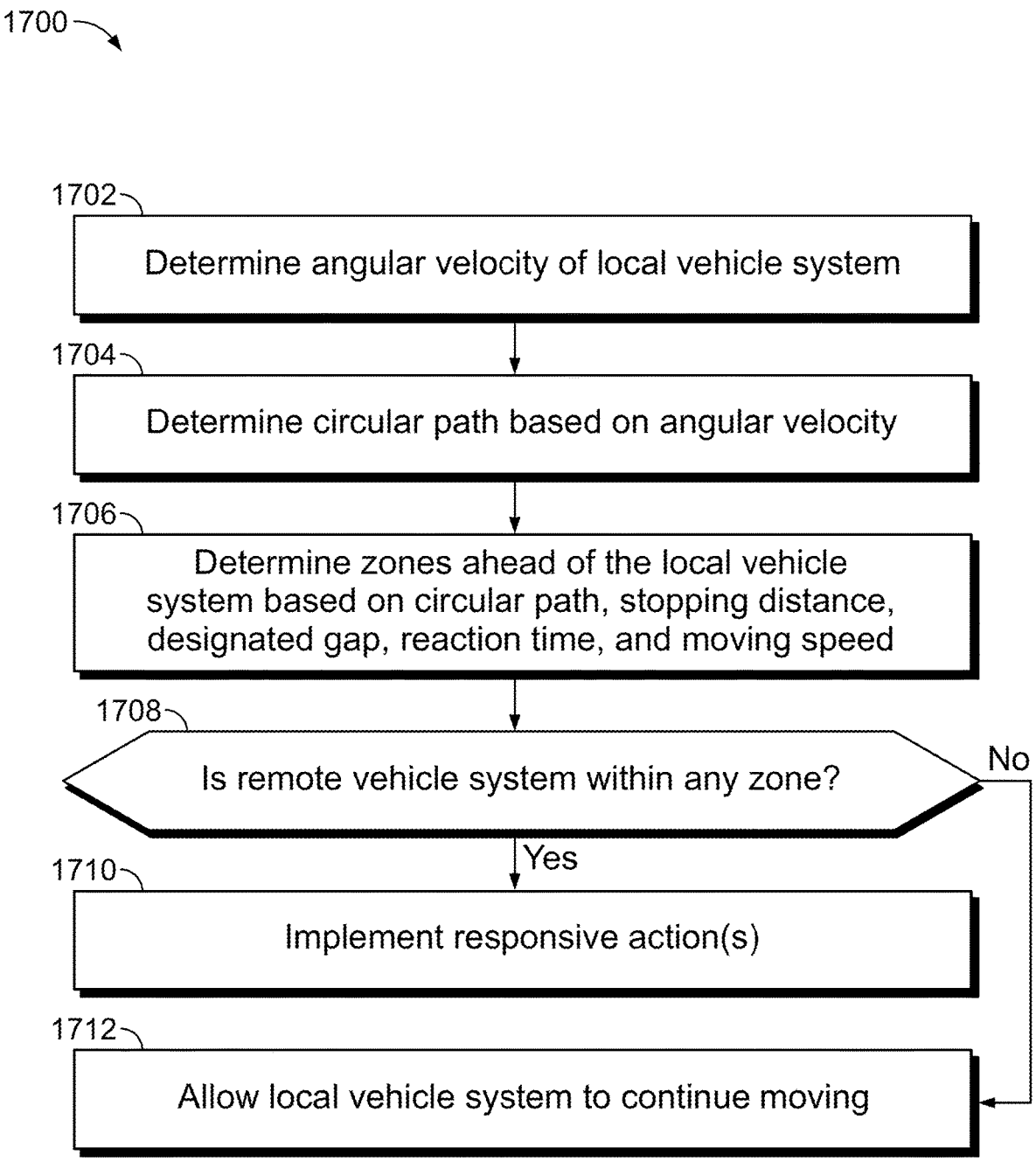
FIG. 17 illustrates a flowchart of another example of a method for avoiding collisions between a vehicle system and at least one other object.

FIG. 17 illustrates a flowchart of another example of a method 1700 for avoiding collisions between a vehicle system and at least one other object (such as another vehicle system). The method can represent operations performed by the collision avoidance systems described herein. At 1702, an angular velocity of a moving vehicle system is determined. The angular velocity can be determined by obtaining samples of headings of the vehicle system and calculating the rate of change in the headings. At 1704, a circular or other curved path is determined based on the angular velocity. The circular or other curved path can be determined by calculating a circumference from the angular velocity, as described above. At 1706, zones ahead of the vehicle system along the circular or other curved path are determined. These zones can include a critical zone closest to the vehicle system, an alert zone farthest from the vehicle system, and a warning zone between the critical zone and the alert zone. The locations and/or sizes of the zones (e.g., lengths of the zones along the circular or curved path) may be determined based on the stopping distance of the vehicle system, a designated gap, a reaction time, and a moving speed of the vehicle system, as described above.

At 1708, a decision is made as to whether any other vehicle system is located within any of the zones. If another, remote vehicle system is within one or more of the zones, then a responsive action may need to be implemented to avoid or reduce the likelihood of a collision between the vehicle systems. As a result, flow of the method 1700 can proceed toward 1710. Otherwise, flow of the method 1700 can proceed toward 1712.

At 1710, one or more responsive actions are implemented. For example, responsive to determining that the remote vehicle system is within (or will be within) the critical zone, movement of the local vehicle system can be automatically stopped. Responsive to determining that the remote vehicle system is within (or will be within) the warning zone, an alarm can be activated, and movement of the local vehicle system optionally can be slowed. Responsive to determining that the remote vehicle system is within (or will be within) the alert zone, an alarm can be activated without automatically slowing or stopping the local vehicle system). Flow of the method 1700 can then terminate or return to another operation (such as 1702, 1704, 1706, or 1708).

At 1712, movement of the local vehicle system may continue along the circular or other curved path. For example, because no other vehicle system is within any of the zones, the local vehicle system may continue moving. Flow of the method 1700 can then terminate or return to another operation (such as 1702, 1704, 1706, or 1708).

Various embodiments disclosed herein relate to avoiding collisions between moving vehicle systems (e.g., local and remote vehicle systems). Alternatively, the remote vehicle system may be stationary and/or can represent another object other than a vehicle. For example, the remote vehicle system can represent a person or other object (e.g., structure, ice or low adhesion surface, etc.) that the local vehicle system wants to avoid colliding with or traveling through.

In one embodiment, a method includes forecasting an upcoming intersection area of projected paths of a first vehicle system and a second vehicle system based on current movements of the first vehicle system and the second vehicle system, calculating a reach distance of the first vehicle system, the reach distance determined as a distance from a leading edge of the first vehicle system to the intersection area, comparing a difference between the reach distance of the first vehicle system and a designated gap distance with the designated gap distance, and one or more of (a) automatically reducing a speed of the first vehicle system responsive to the difference being no smaller than the designated gap distance and/or (b) automatically stopping the first vehicle system responsive to the difference being smaller than the designated gap distance.

Optionally, the method also can include calculating a relative reach distance of the first vehicle system as a first distance traveled by the first vehicle system before the second vehicle system reaches the upcoming intersection area, calculating a clearing distance of the first vehicle system as a second distance from the leading edge of the first vehicle system to a far edge of the intersection area, comparing the relative reach distance of the first vehicle system with the clearing distance of the first vehicle system, and one or more of silencing an alarm of the first vehicle system, preventing automatic slowing of the first vehicle system, and/or preventing automatic stoppage of the first vehicle system responsive to the relative reach distance of the first vehicle system being longer than the clearing distance of the first vehicle system.

The projected paths of the first vehicle system and the second vehicle system can be orthogonal to each other. Or projected paths of the first vehicle system and the second vehicle system can be obliquely angled or acutely angled to each other. The projected paths of the first vehicle system and the second vehicle system can be linear paths and/or curved paths.

The upcoming intersection area can be forecasted by identifying a circular area centered at an intersection of the projected paths of the first vehicle system and the second vehicle system.

In another example, a method includes measuring an angular velocity of a first vehicle system that is moving, calculating an upcoming curved path of the first vehicle system using the angular velocity that is measured, monitoring movement of a second vehicle system, determining whether the second vehicle system will be within a critical distance along the upcoming curved path, a warning distance along the upcoming curved path, or an alert distance along the upcoming curved path within one or more designated periods of time, and one or more of automatically stopping the first vehicle system responsive to determining that the second vehicle system will be within the critical distance within the one or more designated periods of time, automatically slowing the first vehicle system responsive to determining that the second vehicle system will be within the warning distance within the one or more designated periods of time, and/or generating an alert to an operator of the first vehicle system responsive to determining that the second vehicle system will be within the alert distance within the one or more designated periods of time.

The movement of the second vehicle system can be ahead of the first vehicle system and in a direction oriented away from the first vehicle system. The method also can include calculating the critical distance based on a first sum of a stopping distance of the first vehicle system, a designated gap distance, and a first product of a moving speed of the first vehicle system and a designated reaction time.

The method also can include calculating the warning distance based on a second sum of the critical distance and a second product of the moving speed of the first vehicle system and a designated warning time. The method can include calculating the alert distance based on a third sum of the warning distance and a third product of the moving speed of the first vehicle system and a designated alert time.

The movement of the second vehicle system can be ahead of the first vehicle system and in a direction oriented toward the first vehicle system. The method optionally can include calculating the critical distance based on a first sum of a stopping distance of the first vehicle system, a designated gap distance, a first product of a moving speed of the first vehicle system and a designated reaction time, and a closing distance of the second vehicle system.

The method may include calculating the stopping distance of the first vehicle system based on a moving speed of the first vehicle system divided by a deceleration of the first vehicle system. The method can include calculating the closing distance of the second vehicle system as a second product of a moving speed of the second vehicle system and a stopping time of the first vehicle system.

The method may include calculating the warning distance based on a second sum of the critical distance and a second product of the moving speed of the first vehicle system and a designated warning time. The method can include calculating the alert distance based on a third sum of the warning distance and a third product of the moving speed of the first vehicle system and a designated alert time.

In another example, a system includes a vehicle controller configured to be disposed onboard a first vehicle system and to control movement of the first vehicle system. The vehicle controller is configured to forecast an upcoming intersection area of projected paths of the first vehicle system and a second vehicle system based on current movements of the first vehicle system and the second vehicle system. The vehicle controller is configured to calculate a reach distance of the first vehicle system as a distance from a leading edge of the first vehicle system to the intersection area. The vehicle controller is configured to compare a difference between the reach distance of the first vehicle system and a designated gap distance with the designated gap distance. The vehicle controller is configured to one or more of (a) automatically reduce a speed of the first vehicle system responsive to the difference being no smaller than the designated gap distance and/or (b) automatically stop the first vehicle system responsive to the difference being smaller than the designated gap distance.

Optionally, the vehicle controller can be configured to calculate a relative reach distance of the first vehicle system as a first distance traveled by the first vehicle system before the second vehicle system reaches the upcoming intersection area. The vehicle controller can be configured to calculate a clearing distance of the first vehicle system as a second distance from the leading edge of the first vehicle system to a far edge of the intersection area. The vehicle controller can be configured to compare the relative reach distance of the first vehicle system with the clearing distance of the first vehicle system and one or more of silence an alarm of the first vehicle system, prevent automatic slowing of the first vehicle system, and/or prevent automatic stoppage of the first vehicle system responsive to the relative reach distance of the first vehicle system being longer than the clearing distance of the first vehicle system.

While embodiments of the invention are suitable for use with both mobile and stationary implementations, for ease of explanation a mobile implementation is described in detail herein. More specifically, a vehicle has been selected for clarity of illustration for the disclosure of mobile embodiments. Other suitable vehicles include, for example, automobiles and other on-road vehicles, locomotives, construction vehicles/equipment, and other off-road vehicles, marine vessels, and autonomous vehicles (e.g., driverless automobiles). As used herein, "electrical communication" or "electrically coupled" means that certain components are that can communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily a mechanical attachment.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
forecasting an upcoming intersection area of projected paths of a first vehicle system and a second vehicle system based on current movements of the first vehicle system and the second vehicle system;
calculating a reach distance of the first vehicle system, the reach distance determined as a distance from a leading edge of the first vehicle system to the intersection area;
comparing a difference between the reach distance of the first vehicle system and a designated gap distance with the designated gap distance;
one or more of (a) automatically reducing a speed of the first vehicle system responsive to the difference being no smaller than the designated gap distance or (b) automatically stopping the first vehicle system responsive to the difference being smaller than the designated gap distance;
calculating a relative reach distance of the first vehicle system as a first distance traveled by the first vehicle system before the second vehicle system reaches the upcoming intersection area;
calculating a clearing distance of the first vehicle system as a second distance from the first vehicle system to a far edge of the intersection area;
comparing the relative reach distance of the first vehicle system with the clearing distance of the first vehicle system; and
one or more of silencing an alarm of the first vehicle system, preventing automatic slowing of the first vehicle system, or preventing automatic stoppage of the first vehicle system responsive to the relative reach distance of the first vehicle system being longer than the clearing distance of the first vehicle system.

2. The method of claim 1, wherein the projected paths of the first vehicle system and the second vehicle system are orthogonal to each other.

3. The method of claim 1, wherein the projected paths of the first vehicle system and the second vehicle system are obliquely angled or acutely angled to each other.

4. The method of claim 1, wherein the upcoming intersection area is forecasted by identifying a circular area centered at an intersection of the projected paths of the first vehicle system and the second vehicle system.

5. The method of claim 1, wherein the projected paths of the first vehicle system and the second vehicle system are linear paths.

6. The method of claim 1, wherein the projected paths of the first vehicle system and the second vehicle system are curved paths.

7. A method comprising:
measuring an angular velocity of a first vehicle system that is moving;
calculating an upcoming curved path of the first vehicle system using the angular velocity that is measured;
monitoring movement of a second vehicle system that is ahead of the first vehicle system and in a direction oriented away from the first vehicle system;
determining whether the second vehicle system will be within a critical distance along the upcoming curved path, a warning distance along the upcoming curved path, or an alert distance along the upcoming curved path within one or more designated periods of time; and
one or more of automatically stopping the first vehicle system responsive to determining that the second vehicle system will be within the critical distance within the one or more designated periods of time, automatically slowing the first vehicle system responsive to determining that the second vehicle system will be within the warning distance within the one or more designated periods of time, or generating an alert to an operator of the first vehicle system responsive to determining that the second vehicle system will be within the alert distance within the one or more designated periods of time.

8. The method of claim 7, further comprising:
calculating the critical distance as a first sum of a stopping distance of the first vehicle system, a designated gap distance, and a first product of a moving speed of the first vehicle system and a designated reaction time.

9. The method of claim 8, further comprising:
calculating the warning distance as a second sum of the critical distance and a second product of the moving speed of the first vehicle system and a designated warning time.

10. The method of claim 9, further comprising:
calculating the alert distance as a third sum of the warning distance and a third product of the moving speed of the first vehicle system and a designated alert time.

11. The method of claim 7, wherein the movement of the second vehicle system is ahead of the first vehicle system and in a direction oriented toward the first vehicle system.

12. The method of claim 7, further comprising:
calculating the critical distance based on a first sum of a stopping distance of the first vehicle system, a designated gap distance, a first product of a moving speed of the first vehicle system and a designated reaction time, and a closing distance of the second vehicle system.

13. The method of claim 12, further comprising:
calculating the stopping distance of the first vehicle system based on a moving speed of the first vehicle system divided by a deceleration of the first vehicle system.

14. The method of claim 12, further comprising:
calculating the closing distance of the second vehicle system as a second product of a moving speed of the second vehicle system and a stopping time of the first vehicle system.

15. The method of claim 12, further comprising:
calculating the warning distance based on a second sum of the critical distance and a second product of the moving speed of the first vehicle system and a designated warning time.

16. The method of claim 12, further comprising:
calculating the alert distance based on a third sum of the warning distance and a third product of the moving speed of the first vehicle system and a designated alert time.

17. A system comprising:
a vehicle controller configured to be disposed onboard a first vehicle system and to control movement of the first vehicle system, the vehicle controller configured to:
forecast an upcoming intersection area of projected paths of the first vehicle system and a second vehicle system based on current movements of the first vehicle system and the second vehicle system;

calculate a reach distance of the first vehicle system as a distance from a leading edge of the first vehicle system to the intersection area;

compare a difference between the reach distance of the first vehicle system and a designated gap distance with the designated gap distance;

one or more of (a) automatically reduce a speed of the first vehicle system responsive to the difference being no smaller than the designated gap distance or (b) automatically stop the first vehicle system responsive to the difference being smaller than the designated gap distance;

calculate a relative reach distance of the first vehicle system as a first distance traveled by the first vehicle system before the second vehicle system reaches the upcoming intersection area;

calculate a clearing distance of the first vehicle system as a second distance from the first vehicle system to a far edge of the intersection area; and compare the relative reach distance of the first vehicle system with the clearing distance of the first vehicle system and one or more of silence an alarm of the first vehicle system, prevent automatic slowing of the first vehicle system, or prevent automatic stoppage of the first vehicle system responsive to the relative reach distance of the first vehicle system being longer than the clearing distance of the first vehicle system.

* * * * *